US012634366B2

(12) United States Patent
Kimura et al.

(10) Patent No.: US 12,634,366 B2
(45) Date of Patent: May 19, 2026

(54) INFORMATION PROCESSING APPARATUS, INFORMATION PROCESSING SYSTEM, INFORMATION PROCESSING METHOD, AND INFORMATION PROCESSING PROGRAM

(71) Applicant: Sony Group Corporation, Tokyo (JP)

(72) Inventors: Ryota Kimura, Tokyo (JP); Hiroaki Takano, Tokyo (JP); Hirofumi Kasai, Tokyo (JP); Fumio Teraoka, Yokohama (JP); Hiroki Watanabe, Yokohama (JP)

(73) Assignee: SONY GROUP CORPORATION, Tokyo (JP)

( * ) Notice: Subject to any disclaimer, the term of this patent is extended or adjusted under 35 U.S.C. 154(b) by 154 days.

(21) Appl. No.: 18/580,167

(22) PCT Filed: Mar. 22, 2022

(86) PCT No.: PCT/JP2022/013150
§ 371 (c)(1),
(2) Date: Jan. 18, 2024

(87) PCT Pub. No.: WO2023/007834
PCT Pub. Date: Feb. 2, 2023

(65) Prior Publication Data
US 2024/0340344 A1      Oct. 10, 2024

(30) Foreign Application Priority Data
Jul. 28, 2021      (JP) ................................. 2021-123308

(51) Int. Cl.
*H04L 67/12*          (2022.01)
*G16Y 10/75*          (2020.01)
(Continued)

(52) U.S. Cl.
CPC .............. *H04L 67/12* (2013.01); *G16Y 10/75* (2020.01); *G16Y 30/00* (2020.01); *G16Y 40/30* (2020.01)

(58) Field of Classification Search
CPC ........ G16Y 10/75; G16Y 30/00; G16Y 40/30; H04L 67/12; G06F 16/907; G06F 16/909
See application file for complete search history.

(56) References Cited

U.S. PATENT DOCUMENTS

2017/0187807 A1      6/2017   Clernon
2017/0289253 A1*    10/2017   Graefe .................... H04L 67/10
(Continued)

FOREIGN PATENT DOCUMENTS

JP          2018-502440 A        1/2018
JP          2018-018502 A        2/2018
(Continued)

OTHER PUBLICATIONS

International Search Report and Written Opinion mailed on May 31, 2022, received for PCT Application PCT/JP2022/013150, filed on Mar. 22, 2022, 8 pages including English Translation.
(Continued)

*Primary Examiner* — Jason D Recek
(74) *Attorney, Agent, or Firm* — XSENSUS LLP

(57) ABSTRACT

An information processing apparatus operates as an IoTSP 1 (corresponding to an example of "first IoTSP") that provides a service for causing a user to acquire sensor data. The information processing apparatus includes a communication unit that executes communication with another IoTSP (corresponding to an example of "second IoTSP other than the first IoTSP") and a control unit that searches the sensor data corresponding to an acquisition request of the user via an application and responds to the user with the searched sensor data. The control unit searches the sensor data from (Continued)

the other IoTSP via the communication unit based on an identifier of the other IoTSP included in the acquisition request and policy information indicating propriety of information sharing between the IoTSPs and uses a protocol interface including the same procedure as a procedure between the application and IoTSP1 when searching the sensor data.

11 Claims, 45 Drawing Sheets

(51) Int. Cl.
 *G16Y 30/00* (2020.01)
 *G16Y 40/30* (2020.01)

(56) References Cited

U.S. PATENT DOCUMENTS

| | | | | |
|---|---|---|---|---|
| 2019/0230075 | A1* | 7/2019 | Neild | H04L 63/02 |
| 2020/0014660 | A1 | 1/2020 | Kulmala et al. | |
| 2022/0369445 | A1* | 11/2022 | Davenport | H05B 47/13 |

FOREIGN PATENT DOCUMENTS

| | | |
|---|---|---|
| JP | 2018-125647 A | 8/2018 |
| JP | 2018-530038 A | 10/2018 |
| JP | 2019-201428 A | 11/2019 |
| WO | 2019/168191 A1 | 9/2019 |

OTHER PUBLICATIONS

Xie et al., "Multilayer Internet-of-Things Middleware Based on Knowledge Graph", IEEE Internet of Things Journal, vol. 8, No. 4, Feb. 15, 2021, pp. 2635-2648.
"ONEM2M Technical Specification", TS-0001-V4.12.0, Functional Architecture, Sep. 29, 2021, 631 pages.

* cited by examiner

| |
|---|
| Area ID = IdArea_11 |
| Timestamp = 2021-01-15, 10:00:00 |
| SW Lat = 35° 37' 06" N |
| SW Lon = 139° 43' 36" E |
| NE Lat = 35° 37' 12" N |
| NE Lon = 139° 43' 42" E |
| Description = SHINAGAWA-KU, TOKYO |
| isEastOf = IdArea_12 |
| isWestOf = IdArea_13 |
| isSouthOf = IdArea_14 |
| isNorthOf = IdArea_15 |

FIG.8

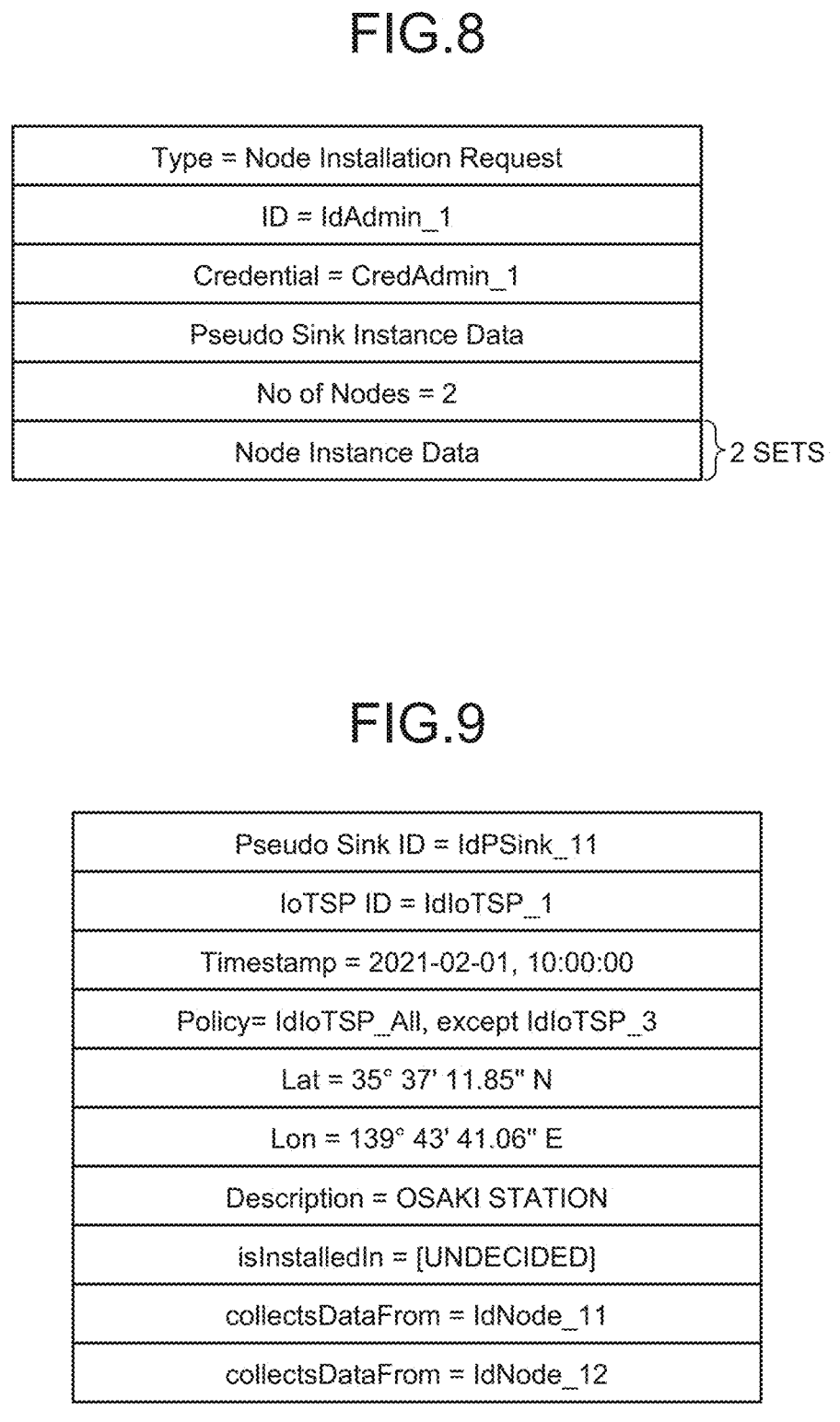

| |
|---|
| Type = Node Installation Request |
| ID = IdAdmin_1 |
| Credential = CredAdmin_1 |
| Pseudo Sink Instance Data |
| No of Nodes = 2 |
| Node Instance Data |

} 2 SETS

FIG.9

| |
|---|
| Pseudo Sink ID = IdPSink_11 |
| IoTSP ID = IdIoTSP_1 |
| Timestamp = 2021-02-01, 10:00:00 |
| Policy= IdIoTSP_All, except IdIoTSP_3 |
| Lat = 35° 37' 11.85" N |
| Lon = 139° 43' 41.06" E |
| Description = OSAKI STATION |
| isInstalledIn = [UNDECIDED] |
| collectsDataFrom = IdNode_11 |
| collectsDataFrom = IdNode_12 |

FIG.10

| |
|---|
| Node ID = IdNode_11 |
| Timestamp = 2021-02-01, 10:00:00 |
| Policy= IdIoTSP_All |
| Description = Outdoor Module |
| Capability = temperature, humidity |
| sendsDataTo = IdPSink_11 |
| isCollocatedWith = IdNode_12 |

FIG.11

| |
|---|
| Node ID = IdNode_12 |
| Timestamp = 2021-02-01, 10:00:00 |
| Policy= IdIoTSP_None |
| Description = Indoor Module |
| Capability = temperature, humidity |
| sendsDataTo = IdPSink_11 |
| isCollocatedWith = IdNode_11 |

FIG.12

| Type = AA Request |
| --- |
| ID = IdAdmin_1 |
| Credential = CredAdmin_1 |

FIG.13

| Type = AA Response |
| --- |
| Status = OK |

FIG.14

| |
|---|
| Type = Node Registration Request |
| Pseudo Sink Instance Data |
| No of Nodes = 2 |
| Node Instance Data |

} 2 SETS

FIG.15

| |
|---|
| Area ID = IdArea_11 |
| Timestamp = 2021-02-01, 10:00:00 |
| SW Lat = 35° 37' 36" N |
| SW Lon = 139° 43' 36" E |
| NE Lat = 35° 37' 12" N |
| NE Lon = 139° 43' 42" E |
| Description = SHINAGAWA-KU, TOKYO |
| isEastOf = IdArea_12 |
| isWestOf = IdArea_13 |
| isSouthOf = IdArea_14 |
| isNorthOf = IdArea_15 |
| contains = IdPSink_11 |

FIG.16

| |
|---|
| Pseudo Sink ID = IdPSink_11 |
| IoTSP ID = IdIoTSP_1 |
| Timestamp = 2021-02-01, 10:00:00 |
| Policy = IdIoTSP_All, except IdIoTSP_3 |
| Lat = 35° 37' 11.85" N |
| Lon = 139° 43' 41.06" E |
| Description = OSAKI STATION |
| isInstalledIn = IdArea_11 |
| collectsDataFrom = IdNode_11 |
| collectsDataFrom = IdNode_12 |

FIG.17

| |
|---|
| Type = Node Registration Response |
| Status = OK |

FIG.18

| Type = Node Installation Response |
| Status = OK |

FIG.19

| Pseudo Sink ID = IdPSink_21 |
| IoTSP ID = IdIoTSP_2 |
| Timestamp = 2021-02-01, 10:00:00 |
| Policy = IdIoTSP_All |
| Lat = 35° 37' 35.37" N |
| Lon = 139° 43' 24.49" E |
| Description = GOTANDA STATION |
| isInstalledIn = IdArea_21 |
| collectsDataFrom = IdNode_21 |

| |
|---|
| Node ID = IdNode_21 |
| Timestamp = 2021-02-01, 10:00:00 |
| Policy= IdIoTSP_All |
| Description = Outdoor Module |
| Capability = temperature, humidity |
| sendsDataTo = IdPSink_21 |

FIG.22

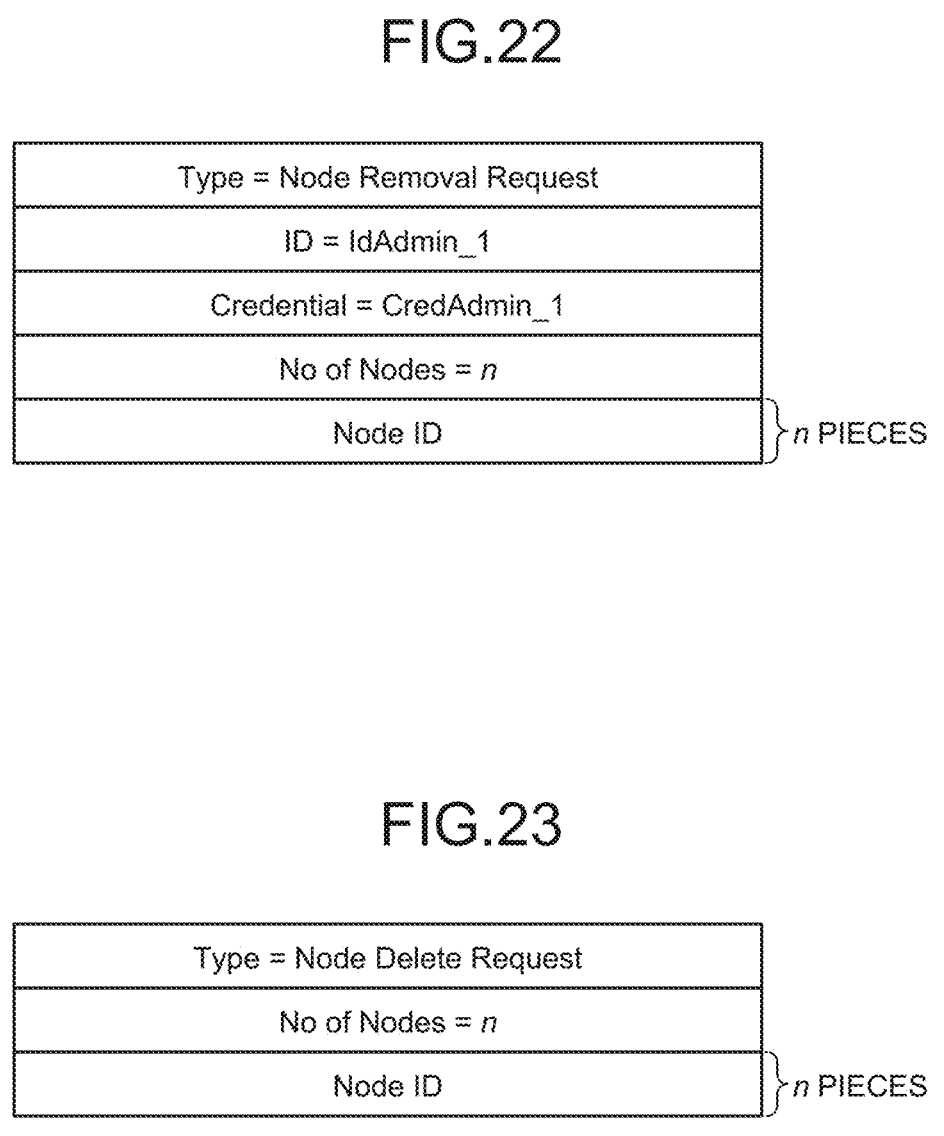

| |
|---|
| Type = Node Removal Request |
| ID = IdAdmin_1 |
| Credential = CredAdmin_1 |
| No of Nodes = $n$ |
| Node ID |

$\}n$ PIECES

FIG.23

| |
|---|
| Type = Node Delete Request |
| No of Nodes = $n$ |
| Node ID |

$\}n$ PIECES

FIG.24

| Type = Node Delete Response |
|---|
| Status = OK |

FIG.25

| Type = Node Removal Response |
|---|
| Status = OK |

FIG.27

| Type = Modified Data Request |
|---|
| Timestamp = 2021-02-01, 00:00:00 |

FIG.28

| Type = Modified Data Response |
|---|
| Status = OK |
| No of Pseudo Sinks = 1 |
| Pseudo Sink Instance Data = [Instance Data of PSink11] |

FIG.29

| Type = Modified Data Notification |
| --- |
| No of Pseudo Sinks = 1 |
| Pseudo Sink Instance Data = [Instance Data of PSink11] (ENCRYPT WITH PUBLIC KEY OF IoTSP2) |

FIG.30

| Type = Modified Data Registration Request |
| --- |
| No of Pseudo Sinks = 1 |
| Pseudo Sink Instance Data = [Instance Data of PSink11] |

FIG.31

| |
|---|
| Type = Modified Data Registration Response |
| Status = OK |

FIG.32

| |
|---|
| Type = Modified Data Notification |
| No of Pseudo Sinks = 1 |
| Pseudo Sink Instance Data = [Instance Data of PSink11] (ENCRYPT WITH PUBLIC KEY OF IoTSP4) |

| Type = Data Report |
| --- |
| Node ID = IdNode_11 |
| Timestamp = 2021-02-08, 10:00:00 |
| Data Format ID |
| Data |

FIG.35

| Type = Data Registration Request |
| --- |
| Node ID = IdNode_11 |
| Timestamp = 2021-02-08, 10:00:00 |
| Data Format ID |
| Data |

FIG.36

| Type = Data Registration Response |
| --- |
| Status = OK |

FIG.38

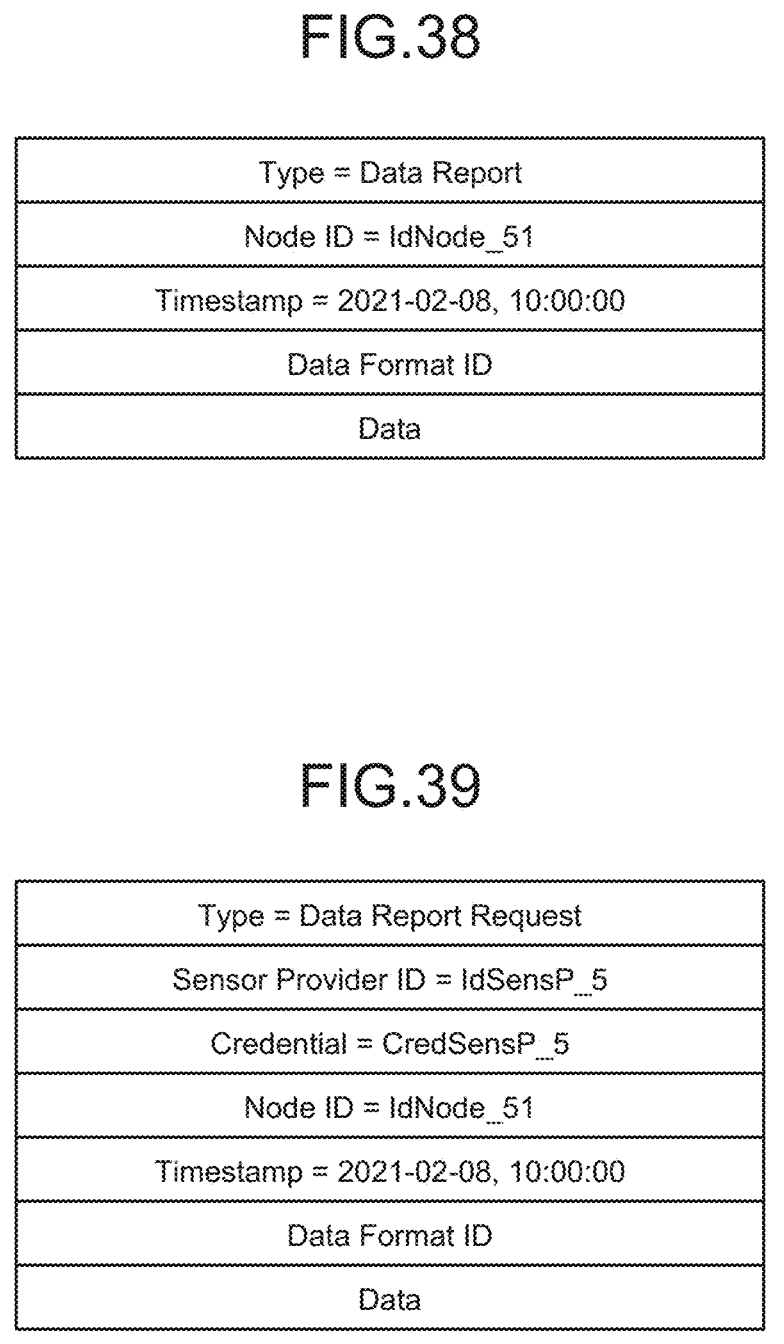

| |
|---|
| Type = Data Report |
| Node ID = IdNode_51 |
| Timestamp = 2021-02-08, 10:00:00 |
| Data Format ID |
| Data |

FIG.39

| |
|---|
| Type = Data Report Request |
| Sensor Provider ID = IdSensP_5 |
| Credential = CredSensP_5 |
| Node ID = IdNode_51 |
| Timestamp = 2021-02-08, 10:00:00 |
| Data Format ID |
| Data |

FIG.40

| Type = AA Request |
| --- |
| ID = IdSensP_5 |
| Credential = CredSensP_5 |

FIG.41

| Type = Data Registration Request |
| --- |
| Node ID = IdNode_51 |
| Timestamp = 2021-02-08, 10:00:00 |
| Data Format ID |
| Data |

| Type = Data Report Response |
| --- |
| Status = OK |

FIG.44

| Type = Mobile Data Report |
|---|
| Node ID = IdNode_13 |
| Credential = CredNode_13 |
| Timestamp = 2021-02-08, 10:00:00 |
| Lat = 35° 37' 12.00" N |
| Lon = 139° 43' 41.00" E |
| Data Format ID |
| Data |

FIG.45

| Type = AA Request |
|---|
| ID = IdNode_13 |
| Credential = CredNode_13 |

FIG.46

| |
|---|
| Type = Data Registration Request |
| Node ID = IdNode_13 |
| Timestamp = 2021-02-08, 10:00:00 |
| Data Format ID |
| Data |

FIG.49

| |
|---|
| Type = Data Retrieve Request |
| ID = IdUser_1 |
| Credential = CredUser_1 |
| SW Lat = 35° 37' 09" N |
| SW Lon = 139° 43' 21" E |
| NE Lat = 35° 37' 39" N |
| NE Lon = 139° 43' 45" E |
| Capability = temperature |
| Start Time = 2021-02-10, 00:00:00 |
| End Time = 2021-02-10, 23:59:59 |

FIG.50

| |
|---|
| Type = AA Request |
| ID = IdUser_1 |
| Credential = CredUser_1 |

FIG.53

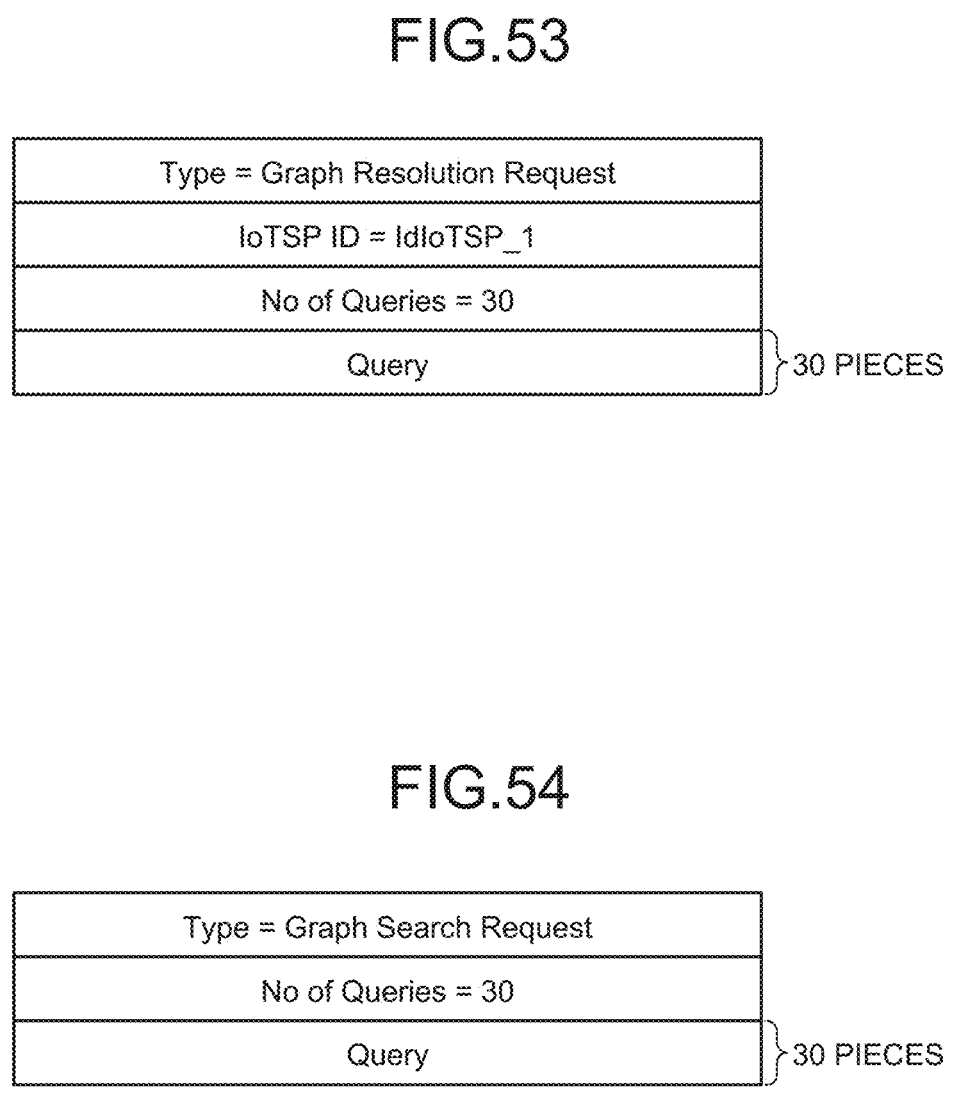

| Type = Graph Resolution Request |
| --- |
| IoTSP ID = IdIoTSP_1 |
| No of Queries = 30 |
| Query |

} 30 PIECES

FIG.54

| Type = Graph Search Request |
| --- |
| No of Queries = 30 |
| Query |

} 30 PIECES

FIG.55

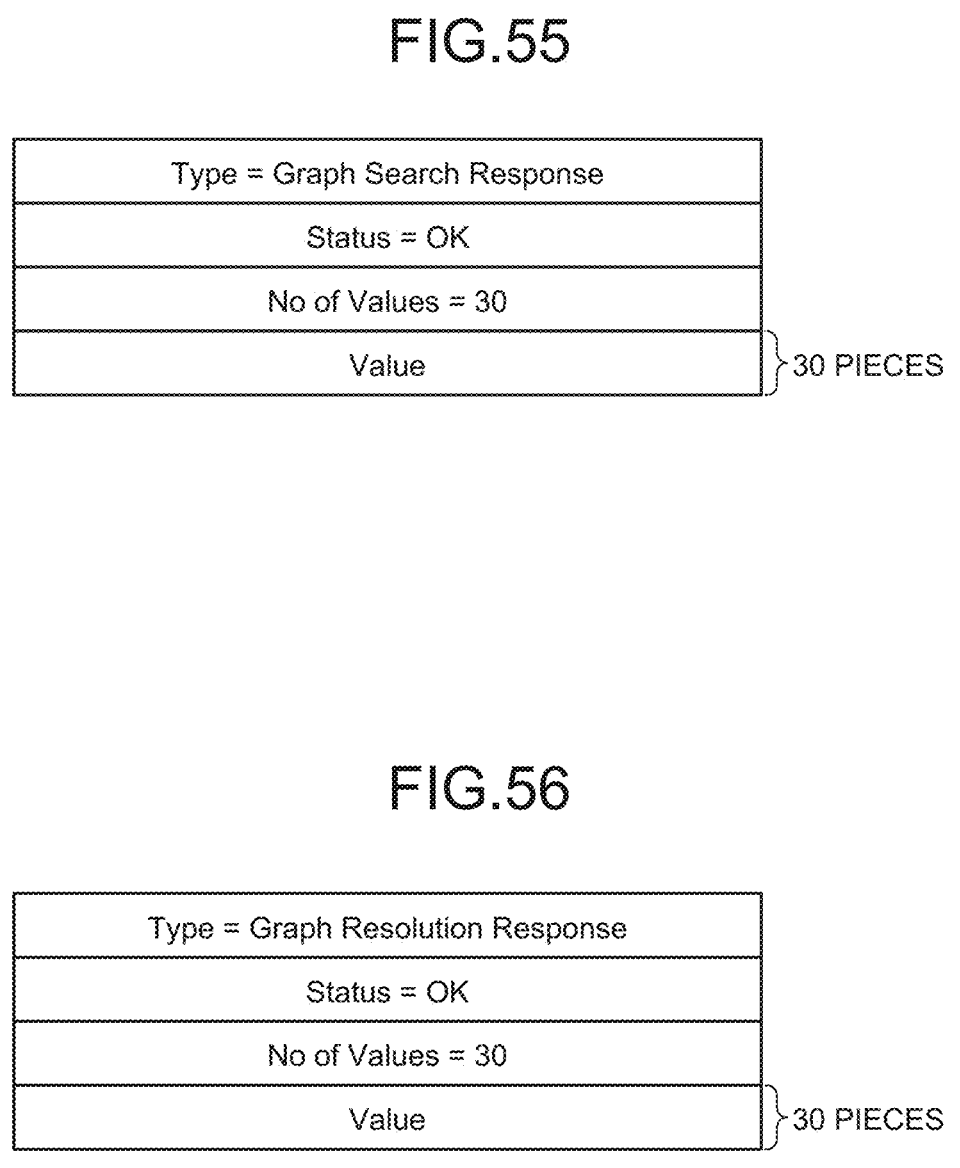

| Type = Graph Search Response |
|---|
| Status = OK |
| No of Values = 30 |
| Value |

} 30 PIECES

FIG.56

| Type = Graph Resolution Response |
|---|
| Status = OK |
| No of Values = 30 |
| Value |

} 30 PIECES

| Type = Graph Resolution Request |
|---|
| IoTSP ID = IdIoTSP_1 |
| No of Queries = 1 |
| Query |

} 1 PIECE

| Type = Graph Resolution Response |
|---|
| Status = OK |
| No of Values = 2 |
| Value |

} 2 PIECES

FIG.60

| Type = Graph Resolution Request |
| ID = IdIoTSP_1 |
| Credential = CredIoTSP_1 |
| IoTSP ID = IdIoTSP_2 |
| No of Queries = 1 |
| Query |

} 1 PIECE

FIG.61

| Type = AA Request |
| ID = IdIoTSP_1 |
| Credential = CredIoTSP_1 |

FIG.62

| Type = Graph Search Request |
| :---: |
| No of Queries = 1 |
| Query |

} 1 PIECE

FIG.63

| Type = Graph Search Response |
| :---: |
| Status = OK |
| No of Values = 1 |
| Value |

} 1 PIECE

FIG.66

| Type = Data Resolution Request |
|---|
| IoTSP ID = IdIoTSP_1 |
| No of Queries = 2 |
| Node ID = IdNode_11 |
| Capability = temperature |
| Start Time = 2021-02-10, 00:00:00 |
| End Time = 2021-02-10, 23:59:59 |
| Node ID = IdNode_12 |
| Capability = temperature |
| Start Time = 2021-02-10, 00:00:00 |
| End Time = 2021-02-10, 23:59:59 |

1 (Node ID = IdNode_11 through End Time = 2021-02-10, 23:59:59)
2 (Node ID = IdNode_12 through End Time = 2021-02-10, 23:59:59)

FIG.67

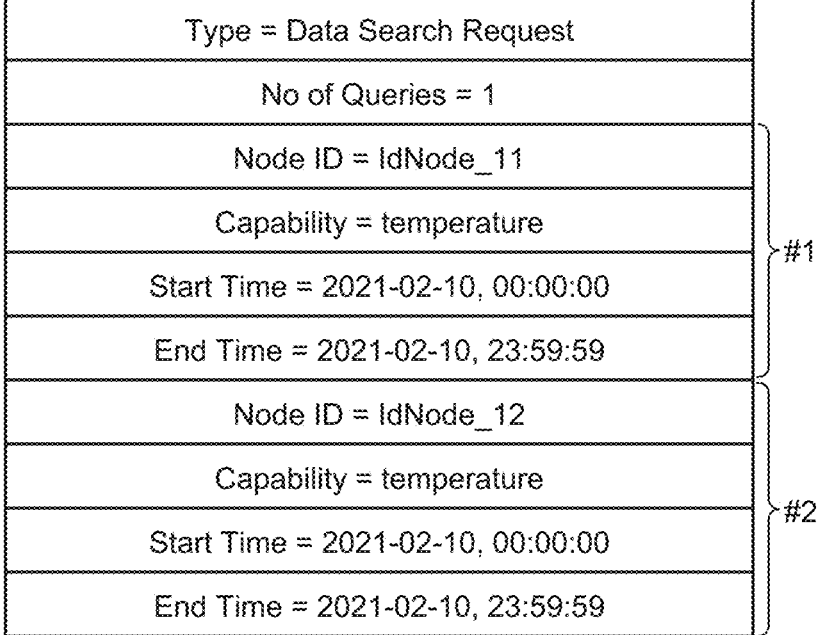

| Type = Data Search Request |
|---|
| No of Queries = 1 |
| Node ID = IdNode_11 |
| Capability = temperature |
| Start Time = 2021-02-10, 00:00:00 |
| End Time = 2021-02-10, 23:59:59 |
| Node ID = IdNode_12 |
| Capability = temperature |
| Start Time = 2021-02-10, 00:00:00 |
| End Time = 2021-02-10, 23:59:59 |

1 (Node ID = IdNode_11 through End Time = 2021-02-10, 23:59:59)
2 (Node ID = IdNode_12 through End Time = 2021-02-10, 23:59:59)

| Type = Data Search Response |
| :---: |
| Status = OK |
| No of Values = $n$ |
| Node ID |
| Capability |
| Timestamp |
| Value |

$n$ PIECES

| Type = Data Resolution Response |
| :---: |
| Status = OK |
| No of Values = $n$ |
| Node ID |
| Capability |
| Timestamp |
| Value |

$n$ PIECES

FIG.71

| |
|---|
| Type = Data Resolution Request |
| ID = IdIoTSP_1 |
| Credential = CredIoTSP_1 |
| IoTSP ID = IdIoTSP_2 |
| No of Queries = 1 |
| Node ID = IdNode_21 |
| Capability = temperature |
| Start Time = 2021-02-10, 00:00:00 |
| End Time = 2021-02-10, 23:59:59 |

| |
|---|
| Type = Data Search Request |
| No of Queries = 1 |
| Node ID = IdNode_21 |
| Capability = temperature |
| Start Time = 2021-02-10, 00:00:00 |
| End Time = 2021-02-10, 23:59:59 |

}1 SET

INFORMATION PROCESSING APPARATUS, INFORMATION PROCESSING SYSTEM, INFORMATION PROCESSING METHOD, AND INFORMATION PROCESSING PROGRAM

CROSS-REFERENCE TO RELATED APPLICATIONS

The present application is based on PCT filing PCT/JP2022/013150, filed Mar. 22, 2022, which claims priority from Japanese Patent Application No. 2021-123308, filed Jul. 28, 2021, the entire contents of each are incorporated herein by reference.

FIELD

The present disclosure relates to an information processing apparatus, an information processing system, an information processing method, and an information processing program.

BACKGROUND

Conventionally, IoT (Internet of Things) that connects all things to the Internet makes it possible to collect information from the things and utilize the information as big data. Examples include information collection of factory equipment, stock information collection, and environmental information collection (see, for example, Non Patent Literature 1.).

On the other hand, since various devices are used in an IoT system, there is also an example in which ontology is defined to define attributes of the devices and a relation among the devices and a unified access method to the devices is implemented (see, for example, Non Patent Literature 2.).

Incidentally, although many IoT systems are closed in themselves and used, it is considered that more advanced services can be provided to users by cooperation of a plurality of IoT systems. Note that the "user" referred to herein includes, in its concept, a person who uses a service provided by the IoT system, a thing (an IoT device, a sensor device, a machine type communication device, or the like) that connects to and communicates with the IoT system besides the person, and an organization and a company including the person and the thing. There are many cases in which sensor equipment such as monitoring cameras installed in shopping streets is not integrated as an IoT system. However, if such sensor equipment can be integrated and in an existing IoT system and used, types of data that can be acquired increase and an area where data can be acquired increases.

"oneM2M" is a standardization organization of an M2M (Machine to Machine) system and an IoT system and defines connection between such IoT systems (See, for example, Non Patent Literatures 3 and 4.). Patent Literatures 1 to 5 also proposes various technologies concerning cooperation of IoT systems.

Note that, in the following explanation, a company that provides sensor data obtained by an IoT system to a user or a system and an apparatus that can be considered the same as the company are referred to as "IoTSP (IoT Service Provider)". An organization that maintains only sensor equipment not integrated as an IoT system is referred to as "sensor provider".

CITATION LIST

Patent Literature

Patent Literature 1: JP 2018-018502 A
Patent Literature 2: JP 2018-125647 A
Patent Literature 3: WO 2019/168191 A
Patent Literature 4: JP 2019-201428 A
Patent Literature 5: JP 2018-530038 A

Non Patent Literature

Non Patent Literature 1: KDDI. IoT utilization example. https://iot.kddi.com/iot/.
Non Patent Literature 2: Cheng Xie, Beibei Yu, Zuoying Zeng, and Yun Yang. Multiplayer Internet-of-Things Middleware Based on Knowledge Graph. IEEE Internet of Things Journal, Vol. 8, No. 4, pp. 2635-2648, 2021.
Non Patent Literature 3: oneM2M. oneM2M Technical Specification: Functional Architecture, February 2021. TS-0001-V4.10.1.
Non Patent Literature 4: oneM2M. Standards for M2M and the Internet of Things. https://onem2m.org.

SUMMARY

Technical Problem

However, the related art described above has room for further improvement in easily implementing cooperation between a plurality of IoTSPs and sensor providers.

Therefore, the present disclosure proposes a new and improved information processing apparatus, information processing system, information processing method, and information processing program capable of easily implementing cooperation between a plurality of IoTSPs and sensor providers.

Solution to Problem

According to the present disclosure, there is provided an information processing apparatus that operates as a first IoTSP that provides a service for causing a user to acquire sensor data. The information processing apparatus includes a communication unit that executes communication with a second IoTSP other than the first IoTSP and a control unit that searches the sensor data corresponding to an acquisition request of the user via an application and responds to the user with the searched sensor data. The control unit searches the sensor data from the second IoTSP via the communication unit based on an identifier of the second IoTSP included in the acquisition request and policy information indicating propriety of information sharing between the IoTSPs and uses a protocol interface including a same procedure as a procedure between the application and the first IoTSP when searching the sensor data.

According to the present disclosure, there is provided an information processing method using an information processing apparatus that operates as a first IoTSP that provides a service for causing a user to acquire sensor data. The method includes executing communication with a second IoTSP other than the first IoTSP and searching the sensor data corresponding to an acquisition request of the user via an application and responding to the user with the searched sensor data. The responding includes searching the sensor data from the second IoTSP via executing the communication based on an identifier of the second IoTSP included in the acquisition request and policy information indicating propriety of information sharing between the IoTSPs and using a protocol interface including a same procedure as a procedure between the application and the first IoTSP when searching the sensor data.

According to the present disclosure, there is provided an information processing program for causing a computer to function as a first IoTSP that provides a service for causing a user to acquire sensor data. The program causes the computer to execute executing communication with a second IoTSP other than the first IoTSP and searching the sensor data corresponding to an acquisition request of the user via an application and responding to the user with the searched sensor data. The responding includes searching the sensor data from the second IoTSP via executing the communication based on an identifier of the second IoTSP included in the acquisition request and policy information indicating propriety of information sharing between the IoTSPs and using a protocol interface including a same procedure as a procedure between the application and the first IoTSP when searching the sensor data.

BRIEF DESCRIPTION OF DRAWINGS

FIG. 8 is a diagram illustrating a structure example of a Node installation request message.

FIG. 9 is a diagram illustrating a structure example of instance data of Pseudo Sink 11 in the Node installation request message.

FIG. 10 is a diagram illustrating a structure example of instance data of a Node 11 in the Node installation request message.

FIG. 11 is a diagram illustrating a structure example of instance data of a Node 12 in the Node installation request message.

FIG. 12 is a diagram illustrating a structure example of an authentication approval request message (1).

FIG. 13 is a diagram illustrating a structure example of an authentication approval response message.

FIG. 14 is a diagram illustrating a structure example of a Node registration request message.

FIG. 15 is a diagram illustrating a structure example of instance data of the Area 11 after Node 11 registration.

FIG. 16 is a diagram illustrating a structure example of instance data of the Pseudo Sink 11 after the Node 11 registration.

FIG. 17 is a diagram illustrating a structure example of a Node registration response message.

FIG. 18 is a diagram illustrating a structure example of a Node installation response message.

FIG. 19 is a diagram illustrating a structure example of instance data of Pseudo Sink 21.

FIG. 22 is a diagram illustrating a structure example of a Node removal request message.

FIG. 23 is a diagram illustrating a structure example of a Node deletion request message.

FIG. 24 is a diagram illustrating a structure example of a Node deletion response message.

FIG. 25 is a diagram illustrating a structure example of a Node removal response message.

FIG. 27 is a diagram illustrating a structure example of a change acquisition request message.

FIG. 28 is a diagram illustrating a structure example of a change acquisition response message.

FIG. 29 is a diagram illustrating a structure example of a change notification message (1).

FIG. 30 is a diagram illustrating a structure example of a change registration request message.

FIG. 31 is a diagram illustrating a structure example of a change registration response message.

FIG. 32 is a diagram illustrating a structure example of a change notification message (2).

FIG. 35 is a diagram illustrating a structure example of a data registration request message (1).

FIG. 36 is a diagram illustrating a structure example of a data registration response message.

FIG. 38 is a diagram illustrating a structure example of a data notification message (2).

FIG. 39 is a diagram illustrating a structure example of a data notification request message.

FIG. 40 is a diagram illustrating a structure example of an authentication approval request message (2).

FIG. 41 is a diagram illustrating a structure example of a data registration request message (2).

FIG. 44 is a diagram illustrating a structure example of a mobile data notification message.

FIG. 45 is a diagram illustrating a structure example of an authentication approval request message (3).

FIG. 46 is a diagram illustrating a structure example of a data registration request message (3).

FIG. 49 is a diagram illustrating a structure example of a data acquisition request message.

FIG. 50 is a diagram illustrating a structure example of an authentication approval request message (4).

FIG. 53 is a diagram illustrating a structure example of a graph resolution request message (1).

FIG. 54 is a diagram illustrating a structure example of a graph search request message (1).

FIG. 55 is a diagram illustrating a structure example of a graph search response message (1).

FIG. 56 is a diagram illustrating a structure example of a graph resolution response message (1).

FIG. 60 is a diagram illustrating a structure example of a graph resolution request message (3).

FIG. 61 is a diagram illustrating a structure example of an authentication approval request message (5).

FIG. 62 is a diagram illustrating a structure example of a graph search request message (2).

FIG. 63 is a diagram illustrating a structure example of a graph search response message (2).

FIG. 66 is a diagram illustrating a structure example of a data resolution request message (1).

FIG. 67 is a diagram illustrating a structure example of a data search request message (1).

FIG. 71 is a diagram illustrating a structure example of a data resolution request message (2).

FIG. 72 is a diagram illustrating a structure example of a data search request message (2).

DESCRIPTION OF EMBODIMENTS

Figure 1:
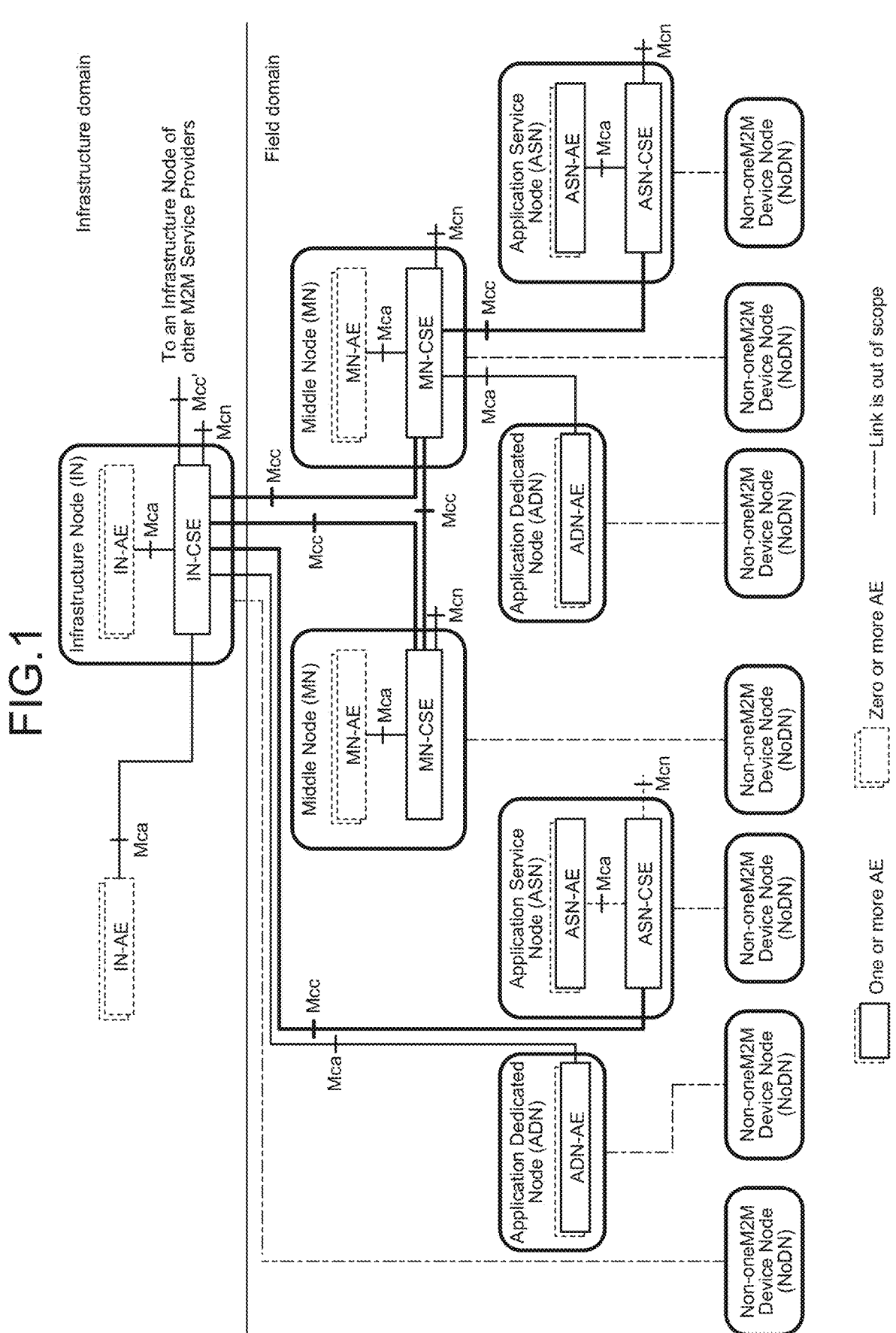
FIG. 1 is a diagram illustrating an architecture of oneM2M.

A referred embodiment of the present disclosure is explained in detail below with reference to the accompanying drawings. Note that, in the present specification and the drawings, components having substantially the same functional configurations are denoted by the same reference numerals and signs to omit redundant explanation of the components.

In the following explanation, causing a plurality of IoTSPs and sensor providers to cooperate is referred to as "IoTSP cooperation".

The explanation is made in the following order.
1. Embodiment of the present disclosure
1.1. Problems in implementing IoTSP cooperation
1.2. Organizing of problems and solution points
1.3. Comparison with the existing technology
1.4. Specific explanation of the IoTSP cooperation
1.4.1. Representation method of geographical information
1.4.2. Representation by ontology of Area, Pseudo Sink, Node, and Mobile Node
1.4.3. System configuration
1.4.4. Definitions of identifiers and credit information
1.4.5. Definition of fields of a message
1.4.6. Definition of fields of instance data
1.4.7. Area instance
1.4.8. Installation of a Node
1.4.9. Node removal
1.4.10. Notification of a configuration change among IoTSPs
1.4.11. Sensor data notification from a Node (1)
1.4.12. Sensor data notification from a Node (2)
1.4.13. Sensor data notification from a Node (3)
1.4.14. Data acquisition by an IoT App
1.4.15. Pseudo Sink resolution procedure
1.4.16. Node resolution procedure
1.4.17. Data resolution procedure (1)
1.4.18. Data resolution procedure (2)
1.5. Functional configuration example of an information processing apparatus
2. Summary
2.1. Effects
2.2. Modifications

1. Embodiment of the Present Disclosure

[1.1. Problems in Implementing IoTSP Cooperation]

Figure 2:
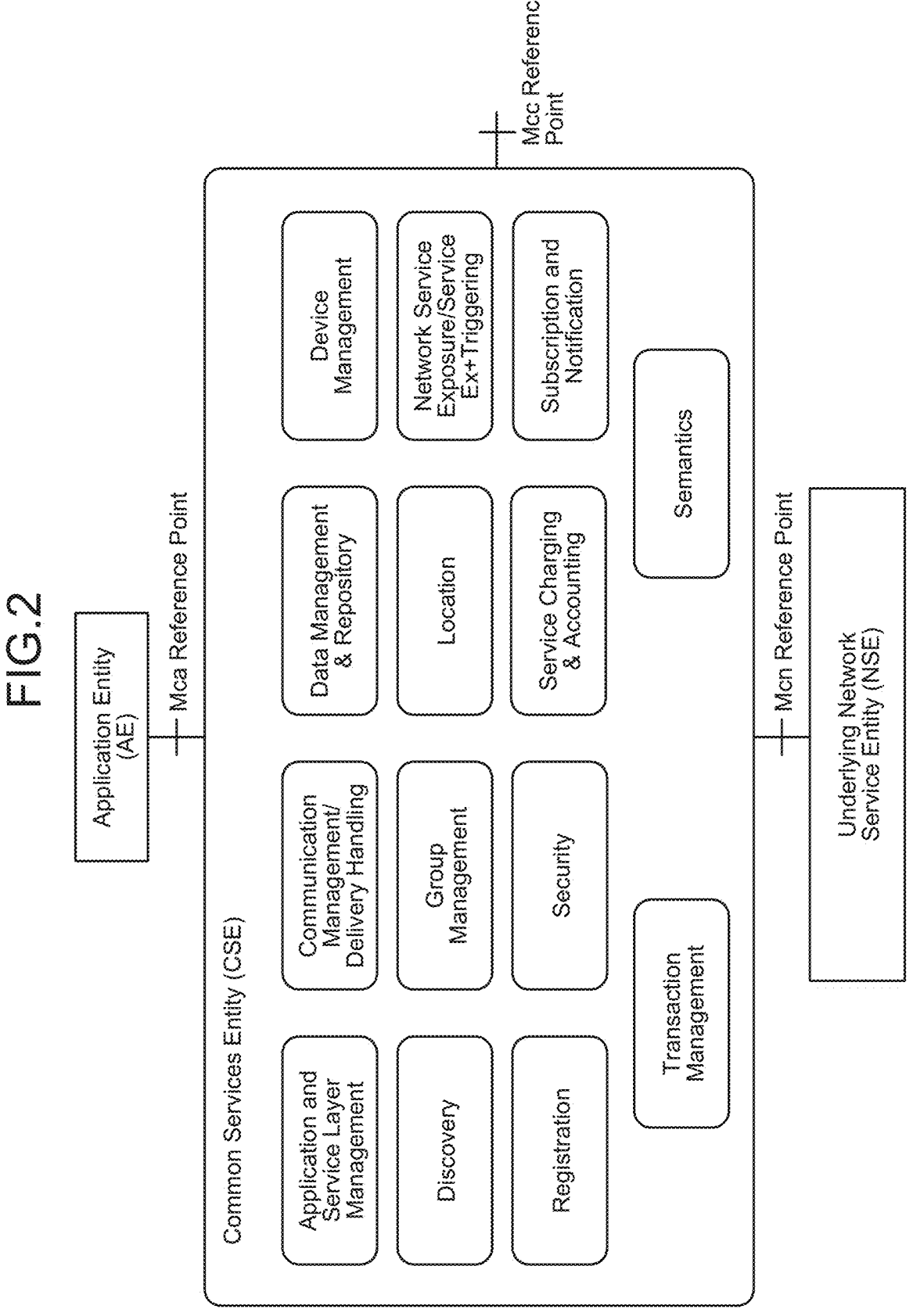
FIG. 2 is a diagram illustrating a CSE in the oneM2M.

Before an embodiment of the present disclosure is explained in detail, first, problems in implementing IoTSP cooperation are specifically explained. FIG. 1 is a diagram illustrating an architecture of oneM2M. FIG. 2 is a diagram illustrating a CSE (Common Services Entity) in the oneM2M.

As illustrated in FIG. 1 and FIG. 2, there is one IN (Infrastructure Node) in each oneM2M service provider and there is a CSE in the IN. The oneM2M service provider connects to other oneM2M service domains with an interface called Mcc' included in a CSE (IN-CSE) in the IN. As illustrated in FIG. 2, the CSE includes many functions and is complex. Therefore, the connection among oneM2M service providers is not easy. Therefore, it can be said that it is necessary to simplify an interface among the IoT systems in order to implement the connection among the IoT systems, that is, IoTSP cooperation.

In order for IoTSPs to cooperate with each other, it is necessary to mutually exchange management information such as areas covered by the IoTSPs and installation places of sensors, and measurement data of the sensors. In the exchange of the management information and the measurement data, an IoTSP that discloses the information is requested to be capable of determining an IoTSP at a disclosure destination.

[1.2. Organizing of Problems and Solution Points]

To organize such problems in the IoTSP cooperation and summarize solution points, first, in the oneM2M, an interface for an IoT system to cooperate is defined. However, the interface is very complicated and it is difficult to implement the interface. Therefore, in the embodiment of the present disclosure, the interface of the IoT system (IoTSP) is unified to a query language (for example, GraphQL) to facilitate cooperation among the IoTSPs. Specifically, a proposed interface is configured by an inquiry to a graph database and an inquiry to a time-series database. An App API (Application Programming Interface) is introduced between an application and an IoTSP. The App API converts a request from the application into a query language to thereby make it easy for the application to access the IoTSP.

Further, the IoTSP requires a server that receive a query, a database, and the like besides a sensor node that is sensor loaded equipment. Therefore, the embodiment of the present disclosure proposes an architecture in which an individual or a small-scale organization who owns a sensor node but has difficulty in operating as an IoTSP is ranked as a sensor provider and the sensor provider provides (sells) sensor data to the IoTSP. Specifically, a Pseudo Sink installed in the sensor provider and a Pseudo Sink installed in the IoTSP cooperate to provide sensor data of the sensor provider to the IoTSP.

When the IoTSPs cooperate, it is necessary to share information among the IoTSPs. Therefore, in the embodiment of the present disclosure, the shared information is propagated according to a predetermined route. Note that, at that time, it is conceivable that an IoTSP at an information transmission source has a policy of sharing information with which IoTSP and not sharing information with which IoTSP. In this regard, in the embodiment of the present disclosure, a field called policy is provided as a data property of a Pseudo Sink instance or a Node instance to make it possible to describe, in the policy field, an IoTSP permitted to share information or an IoTSP not permitted to share information.

[1.3. Comparison with the Existing Technology]

Note that Patent Literature 1 described above proposes a connection device for connection between a robot and an IoT platform and connection among different IoT platforms. In contrast, in the embodiment of the present disclosure, IoT platforms (IoTSP) are connected without using a connection device.

Since various terminals are connected in an IoT network, a method of constructing a closed network such as a VPN (Virtual Private Network) for each IoT service and preventing mutual interference among services is common. However, it is necessary to add a function to IoT terminals. Patent Literature 2 described above proposes a method of installing a relay device or the like on a network side in order to eliminate need to add a function to IoT terminals. The relay device or the like has functions such as name resolution, L3 address assignment, and configuration information distribution. In contrast, in the embodiment of the present disclosure, on the premise that an IoT terminal is appropriately connected to an IoT network (IoTSP), connection among IoT networks (IoTSPs) is focused.

An IoT gateway that connects IoT equipment such as temperature and humidity sensors to a network is known. As a security measure for such IoT equipment, a method of installing, in an IoT gateway, a whitelist in which permitted communications are listed is adopted. Patent Literature 3 proposes a method of quickly creating a whitelist in an IoT gateway. In contrast, in the embodiment of the present disclosure, on the premise that the IoT terminal is safely connected to the IoT network (IoTSP), the connection among the IoT networks (IoTSP) is focused.

In a form in which an IoT device is connected to the Internet via an edge node such as a gateway, it is expected that monitoring and control by the IoT devices installed by different companies A and B at the same point are performed. In such a form, the companies A and B desire to separate the networks. Patent Literature 4 proposes a method of implementing such network separation. In contrast, in the embodiment of the present disclosure, on the premise that the IoT terminal is safely connected to the IoT network (IoTSP), the connection among the IoT networks (IoTSP) is focused.

To connect a device to a restricted network that requires an access credential such as a Wi-Fi (registered trademark) network, a user scans an available network, requests to connect to the available network, and then manually inputs a credential for connecting to the network. Patent Literature 5 proposes a method for automatically enabling a device to be connected in order to enable automatic configuration for a restricted network requiring an access credential. In contrast, in the embodiment of the present disclosure, on the premise that the IoT terminal is safely connected to the IoT network (IoTSP), the connection among the IoT networks (IoTSP) is focused.

Note that the following advantages are generated by the IoTSP cooperation. First, for example, cooperation of an IoTSP for providing weather data (temperature, humidity, wind direction, wind speed, atmospheric pressure, and the like) to a user and a sensor provider having sensor equipment for measuring weather data, that is, cooperation of IoTSP for providing the same type of sensor data and a sensor provider are assumed. Here, it is assumed that a certain IoTSP (IoTSP-A) covers the Kanto region and another IoTSP (IoTSP-B) covers the Tohoku region. It is assumed that a sensor provider-A provides measured weather data to the IoTSP-A. In such a case, a user can obtain weather data in a wider region through cooperation of the IoTSP-A, an IoTSP-B, and a sensor provider-A.

In addition to the IoTSP-A explained above, for example, cooperation of an IoTSP-C that provides data to people in busy quarters in the Kanto region, that is, cooperation of an IoTSP and a sensor provider that provide different kinds of sensor data is assumed. In such a case, the user can learn a relation between a weather condition and crowds by cooperation between the IoTSP-A and the IoTSP-C. In the following explanation, a configuration example for implementing the IoTSP cooperation us specifically explained.

1.4. [Specific Explanation of IoTSP Cooperation]

(1.4.1. Representation Method for Geographical Information)

Equipment loaded with a sensor is referred to as "Node". In an IoT system, since the Node is installed in a real space, a method of treating position information plays an important role. The Node is assumed to be fixedly installed. On the other hand, a Node that moves with a sensor loaded thereon such as an automobile or a smartphone is referred to as "mobile node". In the following explanation, the Node is sometimes described as "node" in katakana. The Node (node) is equivalent to an example of a "sensor node".

In the embodiment of the present disclosure, a geographical area (Area) is represented by a 0.1 minute (6 seconds) square rectangle surrounded by a longitudinal line and a latitudinal line. 0.1 minute of the latitude and the longitude is approximately 185 m near Japan. Note that the length of one side of the Area may be any length. The Node and the Mobile Node transmit sensor data by wireless communication and introduce a "Pseudo Sink" as a module that terminates wireless communication from the Node and connects to a wired network. A radio base station may play a role of the Pseudo Sink or dedicated equipment functioning as the Pseudo Sink may be installed. The Pseudo Sinks are installed in the Area and have latitude and longitude information.

(1.4.2. Representation by Ontology of Area, Pseudo Sink, Node, and Mobile Node)

In the embodiment of the present disclosure, a relation between geographical information and a node is represented by ontology. In the ontology, a relation among matters is represented by a triplet of a subject, a predicate (property), and an object. Since the object can be a subject of another triplet, the relation of matters spreads in a mesh. A type of a matter is referred to as "class" and a specific matter is represented as "instance" of the corresponding class. A predicate representing a relation among classes or instances is referred to as "object property" and a predicate representing a relation between a class or an instance and its attribute is referred to as "data property".

Figure 3:
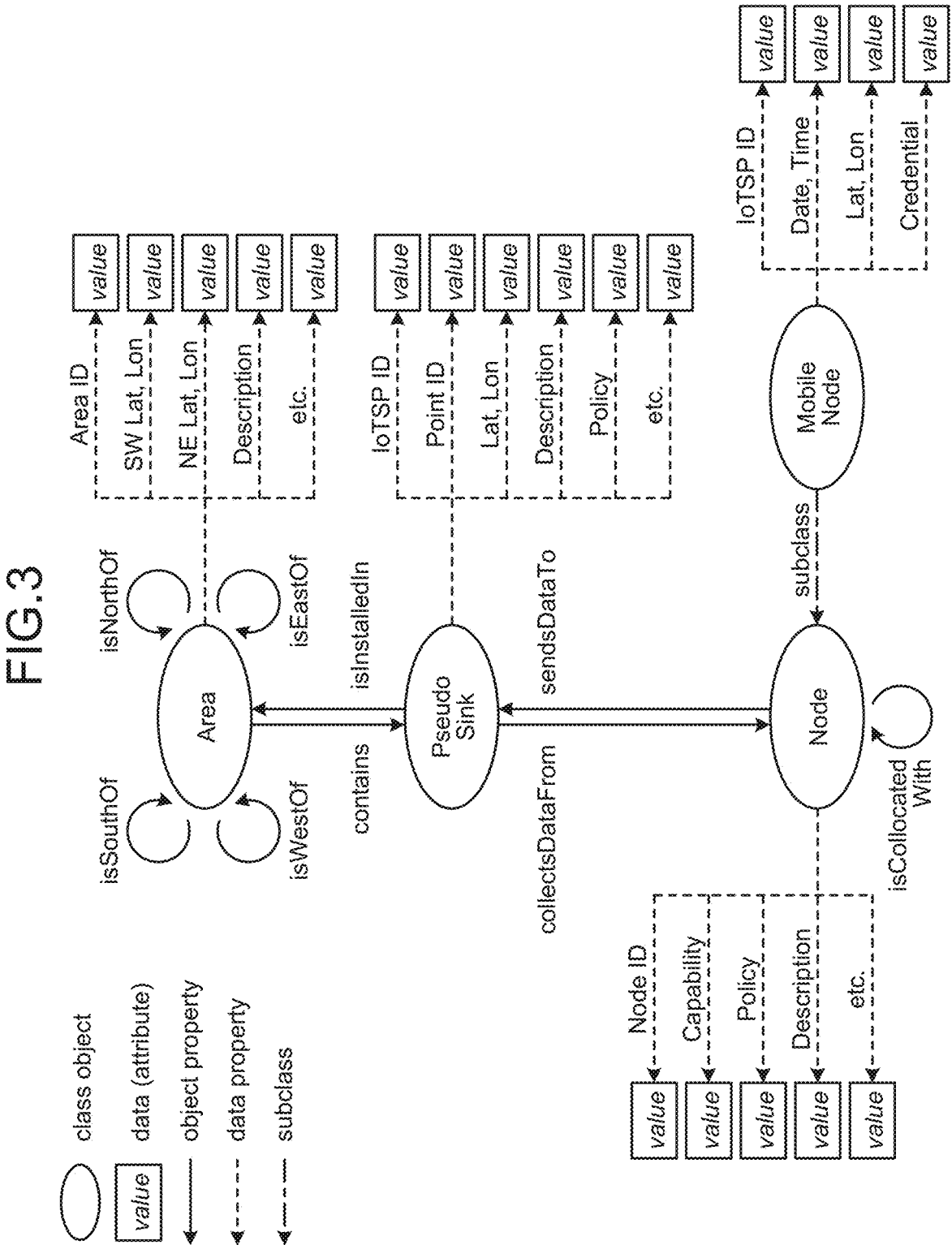
FIG. 3 is a diagram illustrating a relation among classes of Area, Pseudo Sink, Node, and Mobile Node.

FIG. 3 illustrates a relation among an Area class, a Pseudo Sink class, a Node class, and a Mobile Node class. FIG. 3 is a diagram illustrating a relation among classes of Area, Pseudo Sink, Node, and Mobile Node. The Area class has object properties of "isEastOf (adjacent to the east)", "isWestOf (adjacent to the west)", "isSouthOf (adjacent to the south)", and "isNorthOf (adjacent to the north)" and represents an adjacency relation of north, south, east, and west among Area instances. The Area class has data properties such as Area ID (Area identifier), SW Lat, Lon (latitude and longitude of the southwest corner), NW Lat, Lon (latitude and longitude of the north east corner), and Description (annotation). As an example of the annotation of the Area instance, "Shinagawa-ku, Tokyo" and the like are conceivable. The Area class represents a relation with a Pseudo Sink instance with an object property "contains".

The Pseudo Sink class has data properties such as IoTSP ID (IoTSP identifier), Pseudo Sink ID (Pseudo Sink identifier), Lat, Lon (latitude and longitude), Description (annotation), and Policy (policy related to disclosure of management information to another IoTSP). As an example of the annotation of the Pseudo Sink instance, "Osaki Station" and the like are conceivable. As an example of the Policy, a list of IoTSP identifiers that permit information disclosure of the Pseudo Sink instance and the like are conceivable. The Pseudo Sink class represents a relation with the Area instance with an object property of "isInstalledIn (installed)" and represents a relation with a Node instance with an object property of "collectsDataFrom (collecting data)".

The Node class has data properties such as Node ID (Node identifier), Capabilities (functions), Description (annotation), and Policy (propriety of information disclosure to another IoTSP). The Node class represents a relation among Node instances with an object property "isCollocatedWith (installed in the same Pseudo Sink)" and represents a relation of a Pseudo Sink instances with an object property of "sendsDataTo (transmitting data)".

A Mobile Node class is defined as a subclass of the Node class. The Mobile Node subclass has data properties such as IoTSP ID (IoTSP identifier), Date, Time (date and time), Lat, Lon (latitude and longitude), and Credential (authentication information) in addition to the data properties of the Node class.

Figure 4:
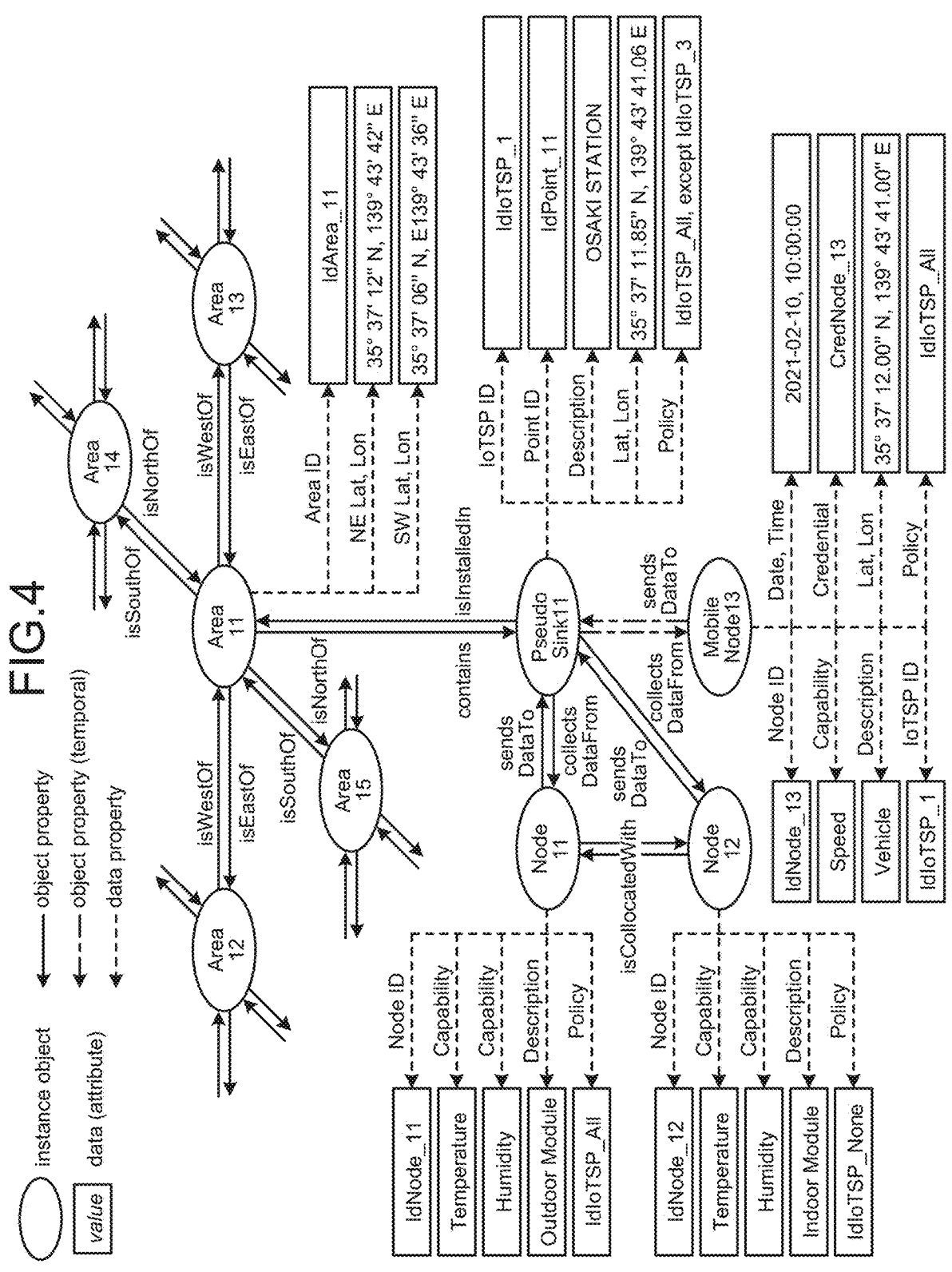
FIG. 4 is a diagram illustrating a relation among instances of Area, Pseudo Sink, Node, and Mobile Node.

FIG. 4 illustrates an example of a relation among an Area instance, a Pseudo Sink instance, a Node instance, and a Mobile Node instance. FIG. 4 is a diagram illustrating a relation among the instances of Area, Pseudo Sink, Node, and Mobile Node. An Area 11 is connected to the adjacent Area 12 to 15 with an object property of "isEastOf", "isWestOf", "isSouthOf", or "isNorthOf". Further, the Area 11 is connected to a Pseudo Sink 11 with object properties of "contains" and "isInstalledIn". The Pseudo Sink 11 is connected to a Node 11 and a Node 12 with the object properties "CollectsDataFrom" and "sendsDataTo". The Node 11 and the Node 12 are connected by an object property of "isCollocatedWith". Further, the Pseudo Sink 11 is connected to a Mobile Node 13 with object properties of "CollectsDataFrom" and "sendsDataTo". In this example, since the Mobile Node 13 enters a wireless communication range of the Pseudo Sink 11 while moving, the Mobile Node 13 is temporarily connected to the Pseudo Sink 11. In the embodiment of the present disclosure, the information of the instance explained above is stored in a Graph DB explained below. However, since the connection relation between the Mobile Node instance and the Pseudo Sink instance is temporary, the connection relation is not stored in a GraphDB.

By expressing the relations as explained above, it is possible to sequentially find, from certain one Area instance, Pseudo Sink instance, Node instance, or Mobile Node instance, an instance having a relation with the instance. For example, by specifying the Area instance, it is possible to search a Node instance installed therein. By designating the Node instance, another Node instance having a relation with the Node instance can be learned.

The Area 11 has values indicating that the latitude of the southwest corner is "35 degrees, 37 minutes, 6 seconds", the longitude of the southwest corner is "139 degrees, 43 minutes, 36 seconds" and the latitude of the northeast corner is "35 degrees, 37 minutes, 12 seconds" and the longitude of the northeast corner is "139 degrees, 43 minutes, 42 seconds" as data properties.

The Pseudo Sink 11 has values indicating that the IoTSP identifier is "IdIoTSP_1", the Pseudo Sink identifier is "IdPSink_11", the Description is "Osaki Station", the latitude is "35 degrees, 37 minutes, 11.85 seconds", and the longitude is "139 degrees, 43 minutes, 41.06 seconds" as data properties. Values of the Policy are "IdIoTSP_ALL" and "except IdIoTSP_3", which indicate that the values can be disclosed to all IoTSPs excluding IoTSP3.

The Node 11 has, as data properties, values indicating that a Node identifier is "IdNode_11", Capability is "Temperature" and "Humidity", Description is "Outdoor Module", and Policy is "IdIoTSP_ALL (published to all other IoTSPs)". The Node 12 also has the same values of data properties as the values of Node 11. However, a value of the Policy is "IoTSP_None (not disclosed in other IoTSP)".

The mobile node 13 has, as data properties, values indicating that a Node identifier is "IdNode_13", an IoTSP identifier (an identifier of the IoTSP contracted with the mobile node 13) is "idIoTSP_1", Capability is "Speed", Description is "Vehicle", Date and Time are "Feb. 10, 2021, 10:00:00", latitude and longitude are "35 degrees, 37 minutes, 12.0 seconds north latitude and 139 degrees, 43 minutes, 41.0 seconds east longitude", Credential is "CredNode_13", and Policy is "IoTSP_ALL".

(1.4.3. System Configuration)

Figure 5:
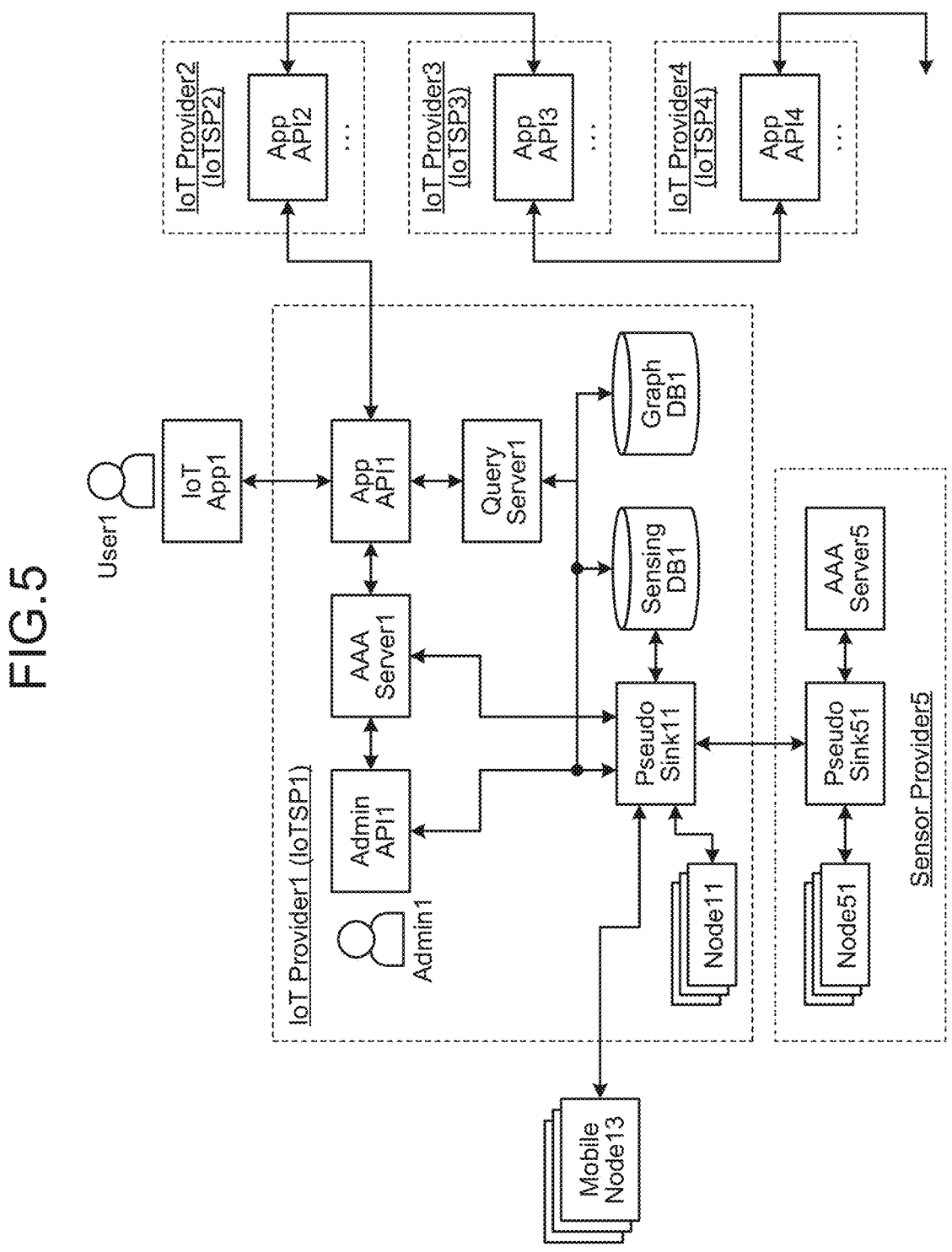
FIG. 5 is a diagram illustrating a configuration example of an IoTSP cooperation system proposed in an embodiment of the present disclosure.

Next, FIG. 5 illustrates a configuration example of a proposed system. FIG. 5 is a diagram illustrating a configuration example of the IoTSP cooperation system proposed in the embodiment of the present disclosure. The IoTSP cooperation system is equivalent to an example of an "information processing system".

FIG. 5 illustrates four IoTSPs ("IoTSP 1" to "IoTSP 4") and one sensor provider ("Sensor Provider 5"). Details of the inside of The IoTSP 1 are illustrated. Insides of the IoTSP 2 to the IoTSP4 are omitted. The number of IoTSPs may be four or more and the number of sensor providers may be two or more. In this example, the IoTSP 1 to the IoTSP 4 are connected in a straight chain shape but a connection form among the IoTSPs is not limited to the straight chain shape. This connection is logical and is assumed to be connected by a secure communication path. It is assumed that all of the IoTSPs recognize a connection relation among the IoTSPs. For example, a method is conceivable in which administrators of the IoTSPs determine a connection relation among the IoTSPs and registers the connection relation in the IoTSPs. In this example, it is assumed that all of the IoTSPs recognize that the IoTSP 1 to the IoTSP4 are connected in the straight chain shape. Further, it is assumed that the IoTSPs have secret keys and public keys in a public key cryptosystem. It is assumed that the secret keys are kept secret by the IoTSPs and the public keys are shared by all of the other IoTSPs. The sensor provider can be included in the concept of "user" in the present specification.

The User is a user who has a contract with an IoTSP. In this example, "User1" has a contract with the IoTSP 1 and obtains sensor data and the like from the IoTSP 1 by using "IoT APP 1", which is an application for users.

The App API is an API for an application, converts a request from the application into a query language, and accesses a Query Server. In this example, "App API 1" receives a request from the "IoT APP 1", converts the request into a query language, and accesses "Query Server 1". Further, the App API implements cooperation among IoTSPs by with the query language. In this example, the App API 1 cooperates with "App API 2" in the IoTSP 2 and implements cooperation between the IoTSP 1 and the IoTSP 2 by with query language.

Admin is an administrator of an IoTSP. In this example, "Admin 1" manages and operates the IoTSP 1 via "Admin API 1", which is a management API.

The Query Server receives a query language from the App API and accesses a Sensing DB and a Graph DB. In this example, the Query Server 1 receives the query language from the App API 1 and accesses "Sensing DB 1" or "Graph DB 1".

An AAA (Authentication, Authorization, and Accounting) Server is a module that performs authentication approval of a user, an administrator, an IoTSP, a sensor provider, and a mobile node. In this example, "AAA Server 1" performs authentication approval for User 1, Admin 1, and "Mobile Node 13". Although not illustrated, "AAA Server 2" in the App API 2 performs authentication approval of the IoTSP 1 and the like.

The graph DB is a database that stores an Area instance, a Pseudo Sink instance, a Node instance, and a Mobile Node instance. Further, the graph DB also has a function of registering instance information in the database and searching instance information in the database. In this example, the Graph DB 1 is a Graph DB in the IoTSP 1.

The Sensing DB is a database that stores time-series data of measured values of sensors. Further, the Sensing DB also has a function of registering sensor data in the database and searching sensor data in the database. In this example, the Sensing DB 1 is a Sensing DB in the IoTSP 1.

The Pseudo Sink is a module that collects sensor data from a Node. In this example, "Pseudo Sink 11" collects sensor data from the Node 11 and the Mobile Node 13. Further, "Pseudo Sink 11" is also connected to "Pseudo Sink 51" and collects sensor data from the Sensor Provider 5.

The Node and the Mobile Node are physical modules loaded with sensors. In this example, since the Node 11 and the like are connected to the Pseudo Sink 11 and the Mobile Node 13 has entered a wireless communication range of the Pseudo Sink 11, the Mobile Node 13 is temporarily connected to the Pseudo Sink 11.

In the Sensor Provider 5, "Node 51" is connected to the Pseudo Sink 51 and the Pseudo Sink 51 is connected to the Pseudo Sink 11 in the IoTSP 1.

(1.4.4. Definition of Identifiers and Credit Information)

Next, identifiers and credit information are defined. Identifiers of the IoTSP 1 to the IoTSP 4 illustrated in FIG. 5 are respectively represented as "IdIoTSP_1" to "IdIoTSP_4". Credit information of the IoTSP 1 to the IoTSP 4 is represented as "CredIoTSP_1" to "CredIoTSP_4". An identifier of the Sensor Provider 5 is represented as "IdSensP_5". Credit information of the Sensor Provider 5 is represented as "CredSensP_5". An identifier of the Admin 1 is represented as "IdAdmin_1". Credit information of the Admin 1 is represented as "CredAdmin_1". An identifier of the User 1 is represented as "IdUser_1". Credit information of the User 1 is represented as "CredUser_1".

Identifiers of the Area 11 to the Area 15 illustrated in FIG. 4 are respectively represented as "IdArea_11" to "IdArea_15". An identifier of the Pseudo Sink 11 is represented as "IdPSink_11". An identifier of the Pseudo Sink 21 is represented as "IdPSink_21". An identifier of the Node 11 is represented as "IdNode_11". An identifier of the Node 12 is "IdNode_12". An identifier of the Mobile Node 13 is represented as "IdNode_13". Credit information of the Mobile Node 13 is represented as "CredNode_13".

(1.4.5. Definition of Fields of a Message)

Next, fields of a message are defined. A "Type" field represents a type of message. The message types include AA Request/Response (authentication approval request/response), Data Registration Request/Response (data registration request/response), Data Report (data notification), Data Report Request/Response (data notification request/response), Data Resolution Request/Response (data resolution request/response), Data Retrieve Request/Response (data acquisition request/response), Data Search Request/Response (data search request/response), Graph Resolution Request/Response (graph resolution request/response), Graph Search Request/Response (graph search request/response), Mobile Data Report (mobile data notification), Modified Data Report (change notification), Modified Data Registration Request/Response (update registration request/response), Modified Data Request/Response (update information request/response), Node Delete Request/Response (node deletion request/response), Node Installation Request/Response (node installation request/response), Node Registration Request/Response (node registration request/response), and Node Removal Request/Response (node removal request/response).

A "Capability" field represents a function of a Node. A "Credential" field represents credit information. The credit information is a password, an electronic certificate, or the like. A "Data Format ID" field represents an identifier of a format of sensor data. An "End Time" field represents an end date and time. An "ID" field represents an identifier of an entity that performs a motion. The entity is a user or an administrator of an IoTSP, the IoTSP itself, or a sensor provider itself. An "IoTSP ID" field represents an identifier of the IoTSP. A "Lat" field and a "Lon" field represent the latitude and longitude of a Pseudo Sink. An "NE Lat" field and an "NE Lon" field represent the latitude and longitude of an Area northeast corner. A "No of Nodes" field represents the number of target Nodes. A "No of Pseudo Sinks" field represents the number of target Pseudo Sinks. A "No of Queries" field represents the number of queries. A "No of Values" field represents the number of values. A "Node ID" field represents an identifier of the Node. A "Node Instance Data" field represents Node instance data. A "Pseudo Sink ID" field represents an identifier of the Pseudo Sink. A "Pseudo Sink Instance Data" field represents instance data of the Pseudo Sink. A "Query" field represents content of a query. A "Sensor Provider ID" field represents an identifier of the sensor provider. A "Start Time" field represents a start date and time. A "Status" field represents an end state of the motion. A "SW Lat" field and a "SW Lon" field represent the latitude and longitude of an Area southwest corner. A "Timestamp" field represents date and time. A "Value" field represents an answer to a query.

(1.4.6. Definition of Fields of Instance Data)

Next, fields of instance data are defined. An "Area ID" field represents an identifier of an Area instance. An "Area Instance Data" field represents all or a part of Area instance data. A "Capability" field represents functions of a Node instance. For example, the functions are "temperature", "humidity", and the like. A "collectsDataFrom" field represents an identifier of a Node instance or a Mobile Node instance connected to the Pseudo Sink instance by an object property collectsDataFrom. A "contains" field represents an identifier of a Pseudo Sink instance connected to the Area instance by an object property "contains". A "Description" field represents an annotation that is easy for the user to understand. For example, Description of the Area instance is "Shinagawa-ku, Tokyo", Description of the Pseudo Sink instance is "Osaki Station", and Description of the Node instance is "Outdoor Module". An "End Time" field represents an end date and time. A "isCollocatedWith" field represents an identifier of a Node instance connected to the Node instance by an object property isCollocatedWith. An "isEastOf" field represents an identifier of an Area instance connected to the Area instance by an object property isEastOf. A "isInstalledIn" field represents an identifier of an Area instance connected to the Pseudo Sink instance by an object property isInstalledIn. A "isNorthOf" field represent an identifier of an Area instance connected to the Area instance by an object property isNorthOf. A "isSouthOf" field represents an identifier of an Area instance connected to the Area instance by an object property isSouthOf. A "isWestOf" field represents an identifier of an Area instance connected to the Area instance by an object property isWestOf. A "NE Lat" field and a "NE Lon" field represent the latitude and longitude of the northeast corner of the Area instance. A "Lat" field and a "Lon" field represent the latitude and longitude of a Pseudo Sink instance. A "No of Nodes" field represents the number of target Node instances. A "No of Pseudo Sinks" field represents the number of target Pseudo Sink instances. A "Node ID" field represents an identifier of a Node instance or a Mobile Node instance. A "Node Instance Data" field represents all or a part of instance data of a Node or a Mobile Node. A "Policy" field represents IoTSP that discloses information. A value may be, for example, a list of identifiers of IoTSP to which disclosure is permitted, "IdIoTSP_ALL" for permitting the disclosure to all IoTSPs, or "IdIoTSP_None" for not permitting disclosure to all IoTSPs. A "Pseudo Sink ID" field represents an identifier of a Pseudo Sink instance. A "Pseudo Sink Instance Data" field represents all or a part of the Pseudo Sink instance data. The "sendsDataTo" field represents an identifier of a Node instance or a Mobile Node instance connected to the Pseudo Sink instance by an object property sendsDataTo. A "Start Time" field represents a start date and time. A "SW Lat" field and a "SW Lon" field represent the latitude and longitude of an Area southwest corner. A "Timestamp" field represents date and time.

(1.4.7. Area Instance)

Figures 6, 7:
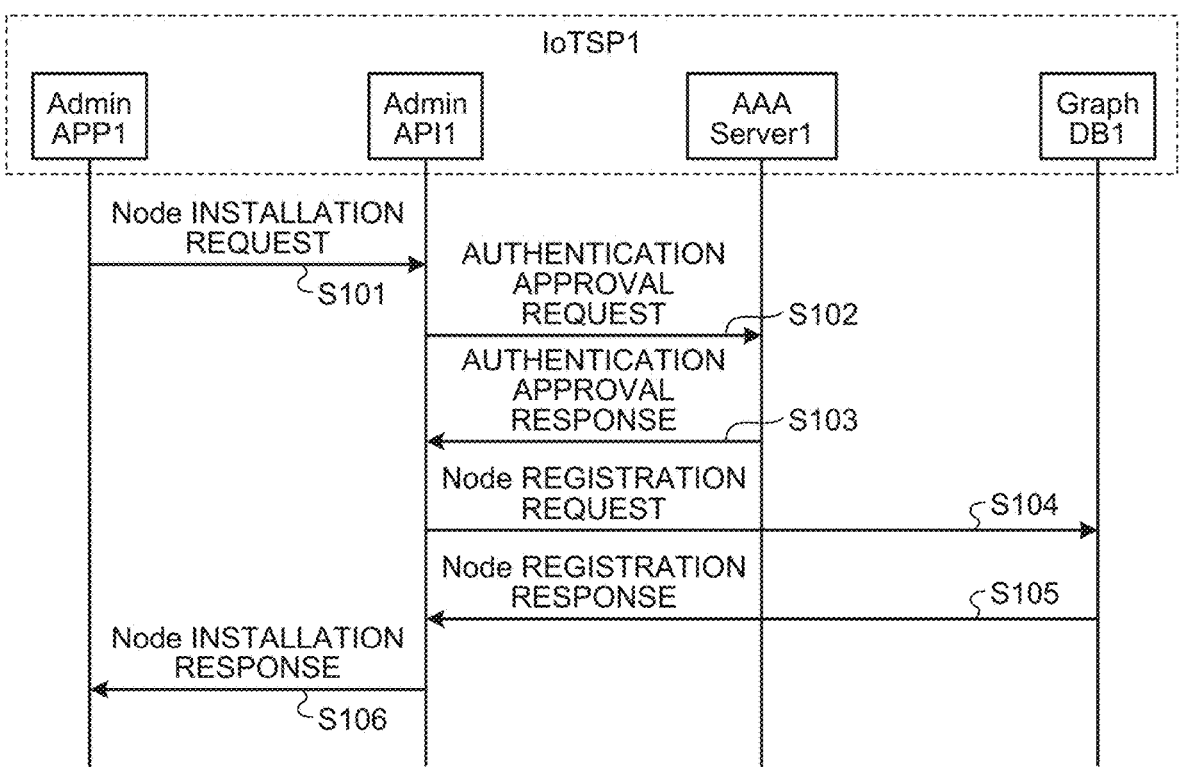
FIG. 6 is a diagram illustrating an example (an initial state) of Area instance data of an Area 11.
FIG. 7 is a diagram illustrating an installation procedure for a Node.

In the system configuration example illustrated in FIG. 5, it is assumed that IoTSPs have stored the instance data of the Area illustrated in FIG. 4 in the Graph DB. For example, Area instance data of the Area 11 before installation of the Pseudo Sink 11 is as illustrated in FIG. 6. FIG. 6 is a diagram illustrating an example (an initial state) of Area instance data of the Area 11. An identifier of the Area instance is "IdArea_11". A last change date and time of the Area instance is "Jan. 15, 2021, 10:00:00". The latitude and longitude of the southwest corner of the Area are "35 degrees, 37 minutes, 06 seconds north latitude" and "139 degrees, 43 minutes, 36 seconds east longitude". The latitude and longitude of the northeast corner of the Area are "35 degrees, 37 minutes, 12 seconds north latitude" and "139 degrees, 43 minutes, 42 seconds east longitude". An annotation of the Area is "Shinagawa-ku, Tokyo". Identifiers of Area instances connected to the Area by isEastOf, isWestOf, isSouthOf, and isNorthOf are "IdArea_12", "IdArea_13", "IdArea_14", and "IdArea_15", respectively.

(1.4.8. Node Installation)

Next, a procedure in the case in which the IoTSP 1 illustrated in FIG. 5 newly installs the Node 11 and the Node 12 illustrated in FIG. 4 is explained with reference to FIG. 7. FIG. 7 is a diagram illustrating an installation procedure for a Node.

The Admin 1 transmits a Node installation request message to the Admin API 1 via Admin APP 1 (Step S101). FIG. 8 illustrates the Node installation request message. A value of an ID field is "IdAdmin_1". A value of a Credential field is "CredAdmin_1". A Pseudo Sink Instance Data field stores instance data of the Pseudo Sink 11 that is a Pseudo Sink for collecting data from the Node 11 and the Node 12. A value of a No of Nodes field is "2". In the following explanation, instance data of the Node 11 and instance data of the Node 12 are stored.

FIG. 9 illustrates instance data of the Pseudo Sink 11. An identifier of the Pseudo Sink instance is "IdPSink_11". A last modification date and time of the Pseudo Sink instance is "Feb. 1, 2021 10:00:00 AM". Information of this Pseudo Sink instance is "disclosable to all other IoTSPs other than the IoTSP3". The latitude and longitude of the Pseudo Sink are 35 degrees, 37 minutes, 11.85 seconds north latitude" and "139 degrees, 43 minutes, 41.06 seconds east longitude". An annotation of the Pseudo Sink is "Osaki Station". An Area instance connected to the Pseudo Sink instance by isInstalledIn is "undecided". Identifiers of Node instances connected to the Pseudo Sink instance by collectsDataFrom are "IdNode_11" and "IdNode_12".

FIG. 10 illustrates instance data of the Node 11. An identifier of the Node instance is "IdNode_11". The date and time when the Node was installed is "Feb. 1, 2021, 10:00 AM". Measurement data of the Node is "disclosable to all the other IoTSPs". An annotation of the Node is "Outdoor Module". The functions of the Node are "temperature" and "humidity". An identifier of a Pseudo Sink instance connected to the Node instance by sendsDataTo is "IdPSink_11". An identifier of a Node instance connected with the Node instance by isCollocatedWith is "IdNode_12".

FIG. 11 illustrates a Node instance representing the Node 12. Contents are the same as those in FIG. 10. However, since the value of a Policy field is "IdIoTSP_None", measurement data of the Node is not disclosed to the other IoTSPs.

When receiving the Node installation request message, the Admin API 1 transmits an authentication approval request message to the AAA Server 1 (Step S102). FIG. 12 illustrates an authentication approval request message. A value of an ID field is "IdAdmin_1". A value of a Credential field is "CredAdmin_1".

When receiving the authentication approval request message, the AAA Server 1 checks authenticity and authority of an entity indicated by the ID field. If the check is successful, the AAA Server 1 transmits an authentication approval response message to the Admin API 1 (Step S103). FIG. 13 illustrates an authentication approval response message. A value of a Status field is "OK" indicating a normal end of processing.

When receiving the authentication approval response message, the Admin API 1 transmits a Node registration request message to the Graph DB 1 (Step S104). FIG. 14 illustrates the Node registration request message. Values of a Pseudo Sink Instance Data field, a No of Nodes field, and a Node Instance Data field of the Node registration request message are the same as those of the Node installation request message illustrated in FIG. 8.

When receiving the Node registration request message, the Graph DB 1 stores Pseudo Sink instance data and Node instance data in the database. Further, the Graph DB 1 updates instance data of the Area 11 in which the Pseudo Sink 11 is installed as illustrated in FIG. 15. A value of a Timestamp field is updated with respect to FIG. 6. Further, a contains field is added and a value is "IdPSink_11". Accordingly, the instance data of the Pseudo Sink 11 is updated as illustrated in FIG. 16. That is, a value of an isInstalledIn field is "IdArea_11".

Next, the Graph DB 1 transmits a Node registration response message to the Admin API 1 (Step S105). FIG. 17 illustrates the Node registration response message. A value of a Status field is "OK" indicating a normal end of processing.

When receiving the Node registration response message, the Admin API 1 transmits a Node installation response message to the Admin APP 1 (Step S106). FIG. 18 illustrates the Node installation response message. The Status field is "OK" indicating a normal end.

Figures 20, 21:
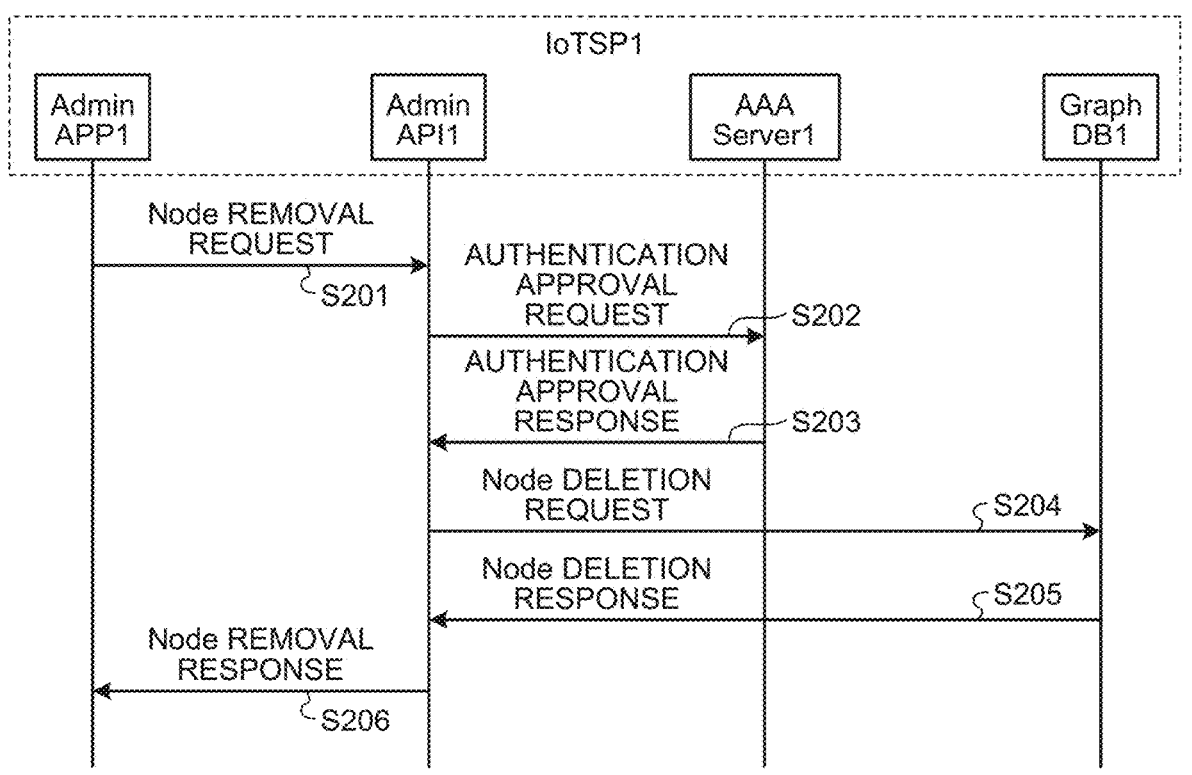
FIG. 20 is a diagram illustrating a structure example of instance data of a Node 21.
FIG. 21 is a diagram illustrating a removal procedure for a Node.

Further, it is assumed that a Node 21 is installed in a Pseudo Sink 21 in an IoTSP 2 by the same procedure as described above. FIG. 19 illustrates instance data of the Pseudo Sink 21. FIG. 20 illustrates instance data of the Node 21.

(1.4.9. Node Removal)

Next, FIG. 21 illustrates a procedure for removing a Node in the IoTSP 1. FIG. 21 is a diagram illustrating a removal procedure for a Node.

The Admin 1 transmits a Node removal request message to the Admin API 1 via the Admin APP 1 (Step S201). FIG. 22 illustrates the Node removal request message. A value of an ID field is "IdAdmin_1". A value of a Credential field is "CredAdmin_1". A No of Nodes field represents the number of nodes to be removed. In the following explanation, a Node ID field continues by the number of values of the No of Nodes field.

When receiving the Node removal request message, the Admin API 1 transmits an authentication approval request message to the AAA Server 1 (Step S202). FIG. 12 illustrates an authentication approval request message.

When receiving the authentication approval request message, the AAA Server 1 checks authenticity and authority of an entity indicated by the ID field. If the check is successful, the AAA Server 1 transmits an authentication approval response message to the Admin APP 1 (Step S203). FIG. 13 illustrates an authentication approval response message.

When receiving the authentication approval response message, the Admin API 1 transmits a Node deletion request message to the Graph DB 1 (Step S204). FIG. 23 illustrates the Node deletion request message. Values of a No of Nodes field and a Node ID field of the Node deletion request message are similar to those of the Node removal request message illustrated in FIG. 22.

When receiving the Node deletion response message, the Graph DB 1 deletes a Node instance indicated by the Node ID field from the database. Accordingly, for a Pseudo Sink instance indicated by a sendsDataTo field of the Node instance to be deleted, a corresponding collectsDataFrom field is deleted. When the number of collectsDataFrom fields becomes 0 as a result of the deletion, a corresponding Pseudo Sink Instance Data is also deleted.

Figures 24, 25:
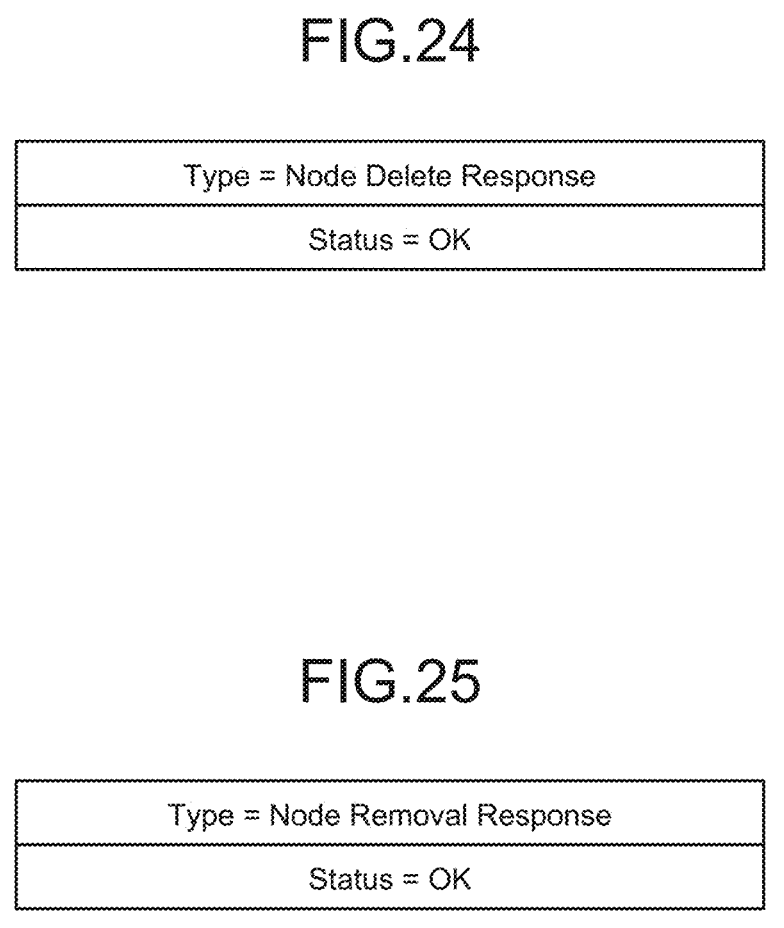

Next, the Graph DB 1 transmits a Node deletion response message to the Admin API 1 (Step S205). FIG. 24 illustrates the Node deletion response message. The Status field is "OK" indicating a normal end.

When receiving the Node deletion response message, the Admin API 1 transmits a Node removal response message to the IoTSP Admin 1 (Step S206). FIG. 25 illustrates the Node removal response message. The Status field is "OK" indicating a normal end.

(1.4.10. Notification of a Configuration Change Among IoTSPs)

Figure 26:
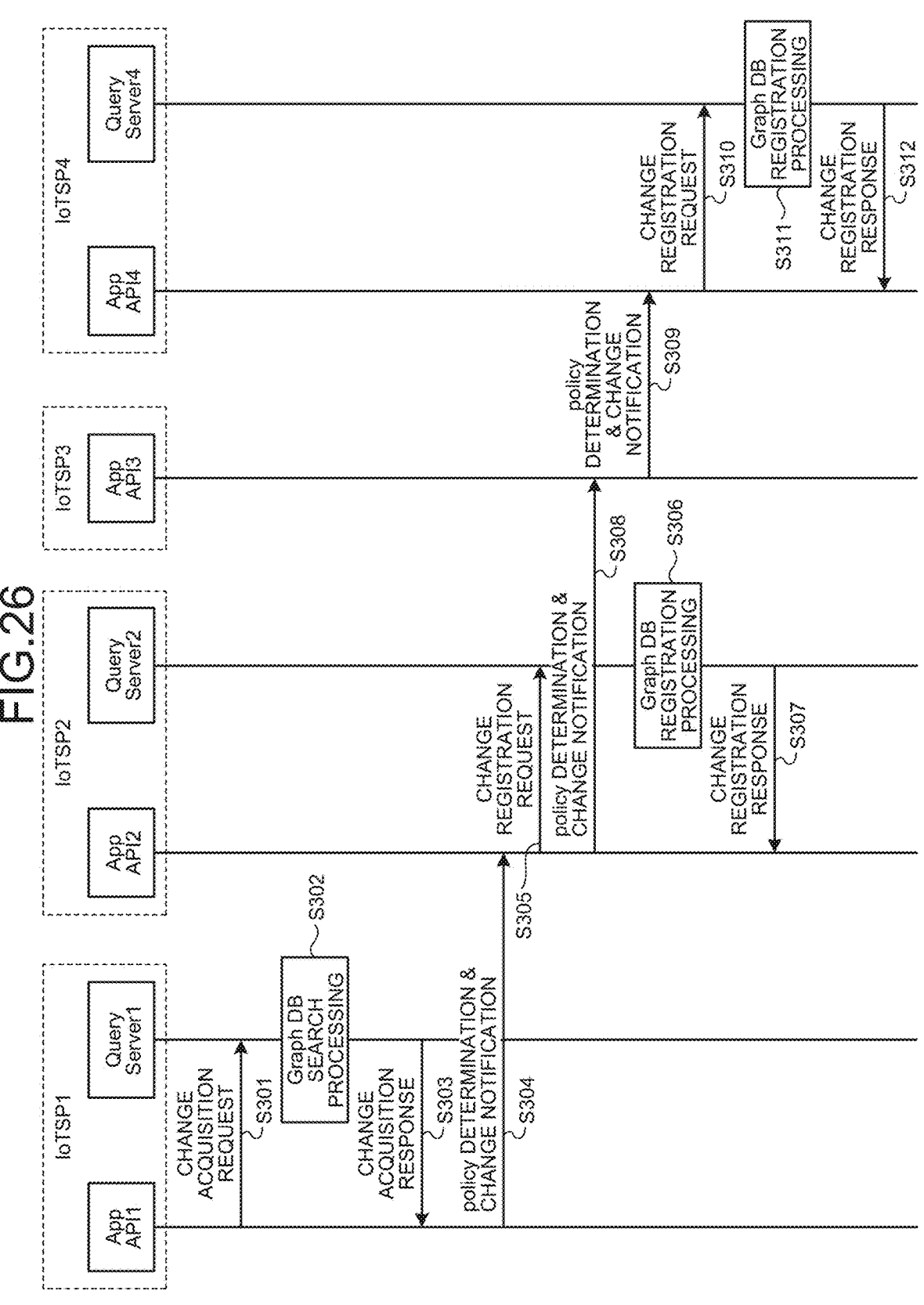
FIG. 26 is a diagram illustrating a configuration change notification procedure among IoTSPs.

In the example explained above, the IoTSP1 installed the Pseudo Sink 11 under its own control. In the embodiment of the present disclosure, such a configuration change is shared among IoTSPs. FIG. 26 illustrates an example of a procedure for notifying the configuration change of the IoTSP 1 to the other IoTSPs. FIG. 26 is a diagram illustrating a configuration change notification procedure among IoTSPs.

The App API 1 in the IoTSP 1 transmits a change acquisition request message to the Query Server 1 in order to learn a configuration change in the IoTSP 1 (Step S301). FIG. 27 illustrates the change acquisition request message. A Timestamp field indicates that information updated after a date and time indicated in this field is requested. In this example, The Timestamp field is "Feb. 1, 2021, 0:00:00".

When receiving the change acquisition request message, the Query Server 1 inquires the Graph DB 1 about configuration information changed after the time indicated by the Timestamp field (Step S302). Note that, in FIG. 26, a procedure of inquiring the Graph DB 1 is omitted.

When receiving the changed configuration information from the Graph DB 1, the Query Server 1 transmits a change acquisition response message to the App API 1 (Step S303). FIG. 28 illustrates the change acquisition response message. The Status field is "OK" indicating a normal end. Since one Pseudo Sink (Pseudo Sink 11) has been added after the designated time, the value of the No of Pseudo Sinks field is "1". Content of the Pseudo Sink Instance Data field is the same as the instance data of the Pseudo Sink 11 illustrated in FIG. 16.

When receiving the change acquisition response message, the App API 1 transmits a change notification message to the App API 2 in the IoTSP 2 that is a predetermined transfer destination (Step S304). FIG. 29 illustrates the change notification message. A value of a No of Pseudo Sinks field is "1". A value of a Pseudo Sink Instance Data field is obtained by encrypting the instance data of the Pseudo Sink 11 illustrated in FIG. 16 with a public key of the IoTSP 2. That is, at this time, the App API 1 determines a disclosure destination/a non-disclosure destination with the Policy field illustrated in FIG. 16 (see Step S304). In the case of the example illustrated in FIG. 16, since only an IoTSP 3 is a non-disclosure destination, the App API 1 encrypts instance data of the Pseudo Sink 11 with the public key of the IoTSP 2.

When receiving the change notification message, the App API 2 decrypts the Pseudo Sink Instance Data field using its private key. Next, the App API 2 transmits a change registration request message to the Query Server 2 (Step S305). FIG. 30 illustrates the change registration request message. A value of the No of Pseudo Sinks field is "1". A value of a Pseudo Sink Instance Data field is the same as the instance data of the Pseudo Sink 11 illustrated in FIG. 16.

When receiving the change registration request message, the Query Server 2 accesses the Graph DB2 and registers change information (Step S306). Note that, in FIG. 26, a registration procedure in the Graph DB 2 is omitted.

Next, the Query Server 2 transmits a change registration response message to the App API 2 (Step S307). FIG. 31 illustrates the change registration response message. A value of a Status field is "OK" indicating a normal end.

The App API 2 transmits a change registration request message to the Query Server 2 and transmits a change notification message to the App API 3 in the IoTSP 3 (Step S308). FIG. 32 illustrates the change notification message. A value of the No of Pseudo Sinks field is "1". The App API 2 refers to the policy field of the instance data of the Pseudo Sink 11 illustrated in FIG. 16, learns that information disclosure of the Pseudo Sink is prohibited to the IoTSP 3 that is the next transfer destination of the change notification message, encrypts the instance data of the Pseudo Sink 11 with a public key of the IoTSP 4 that is the next transfer destination, and stores the encrypted instance data in a Pseudo Sink Instance Data field. That is, at this time, the App API 2 determines a disclosure destination/a non-disclosure destination according to the Policy field illustrated in FIG. 16 (see Step S308). In the case of the example illustrated in FIG. 16, since only the IoTSP 3 is the non-disclosure destination, the App API 2 encrypts the instance data of the Pseudo Sink 11 with the public key of the IoTSP 4.

When receiving the change notification message, the App API 3 attempts to decrypt the Pseudo Sink Instance Data field with its own private key. However, the field cannot be decrypted because the field is encrypted by the public key of IoTSP4. Therefore, the App API 3 transmits the change notification message to an App API 4 in the IoTSP 4 that is the next transfer destination (Step S309). FIG. 32 illustrates the change notification message. That is, at this time, it can be said that the App API 3 determines a disclosure destination/a non-disclosure destination of the Policy field because the Pseudo Sink Instance Data field cannot be decrypted by its own private key (see Step S309).

When receiving the change notification message, the App API 4 decrypts the Pseudo Sink Instance Data field using its private key. Subsequently, the App API 4 transmits a change registration request message to the Query Server 4 (Step S310). FIG. 30 illustrates the change registration request message.

When receiving the change registration request message, the Query Server 4 accesses a Graph DB 4 and registers the change information (Step S311). Note that, in FIG. 26, a registration procedure for the Graph DB 4 is omitted.

Subsequently, the Query Server 4 transmits a change registration response message to the App API 4 (Step S312). FIG. 31 illustrates the change registration response message.

Similarly, the IoTSP 2, the IoTSP 3, and the IoTS 4 notify the configuration change to the other IoTSPs as well. In this example, information concerning the Pseudo Sink 21 illustrated in FIG. 19 is notified from the IoTSP 2 to the IoTSP 1, the IoTSP 3, and the IoTSP 4.
(1.4.11. Sensor Data Notification from a Node (1))

Figures 33, 34:
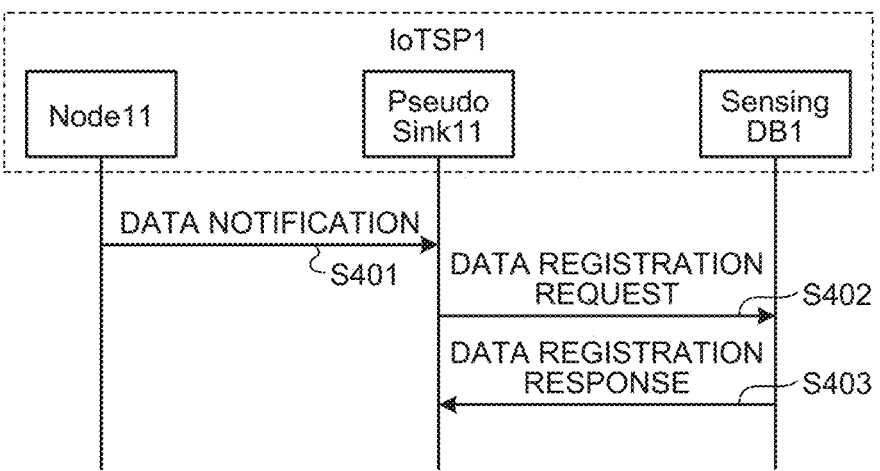
FIG. 33 is a diagram illustrating a sensor data notification procedure from a Node (1).
FIG. 34 is a diagram illustrating a structure example of a data notification message (1).

A Node periodically transmits measured data to a Pseudo Sink. FIG. 33 illustrates a procedure in which the Node 11 installed in the IoTSP 1 registers measurement data in the IoTSP 1 in FIG. 5. FIG. 33 is a diagram illustrating a sensor data notification procedure from the Node (1). The notification procedure (1) indicates a data notification procedure in the IoTSP.

The node 11 periodically transmits measurement data such as temperature to Pseudo Sink 11 in a data notification message (Step S401). It is assumed that communication between the Node 11 and the Pseudo Sink 11 is secure. FIG. 34 illustrates a data notification message. A value of a Node ID field is "IdNode_11". A Timestamp field indicates a date and time when sensor data was measured and is "Feb. 8, 2021, 10:00:00" in this example. A Data Format ID field represents an identifier of a format of data stored in a Data field. Sensor data is stored in the Data field.

When receiving the data notification message, the Pseudo Sink 11 transmits a data registration request message to the Sensing DB 1 (Step S402). FIG. 35 illustrates a data registration request message. Values of the Node ID field, the Timestamp field, the Data Format ID field, and the Data field are the same as those in FIG. 34.

The Sensing DB 1 is a database that stores a time series of sensor data for each of Nodes. That is, one row (one record) is configured by at least a date and time, an identifier of a Node, Capability, a value of sensor data, an identifier of a Pseudo Sink, and latitude and longitude. When receiving the data registration request message, the Sensing DB 1 stores the value of the Node ID field, the value of the Timestamp field, and the value of the Data field in the database. Thereafter, the Sensing DB 1 transmits a data registration response message to the Pseudo Sink 11 (Step S403). FIG. 36 illustrates the data registration response message. The Status field is "OK" indicating a normal end.
(1.4.12. Sensor Data Notification from a Node (2))

Figure 37:
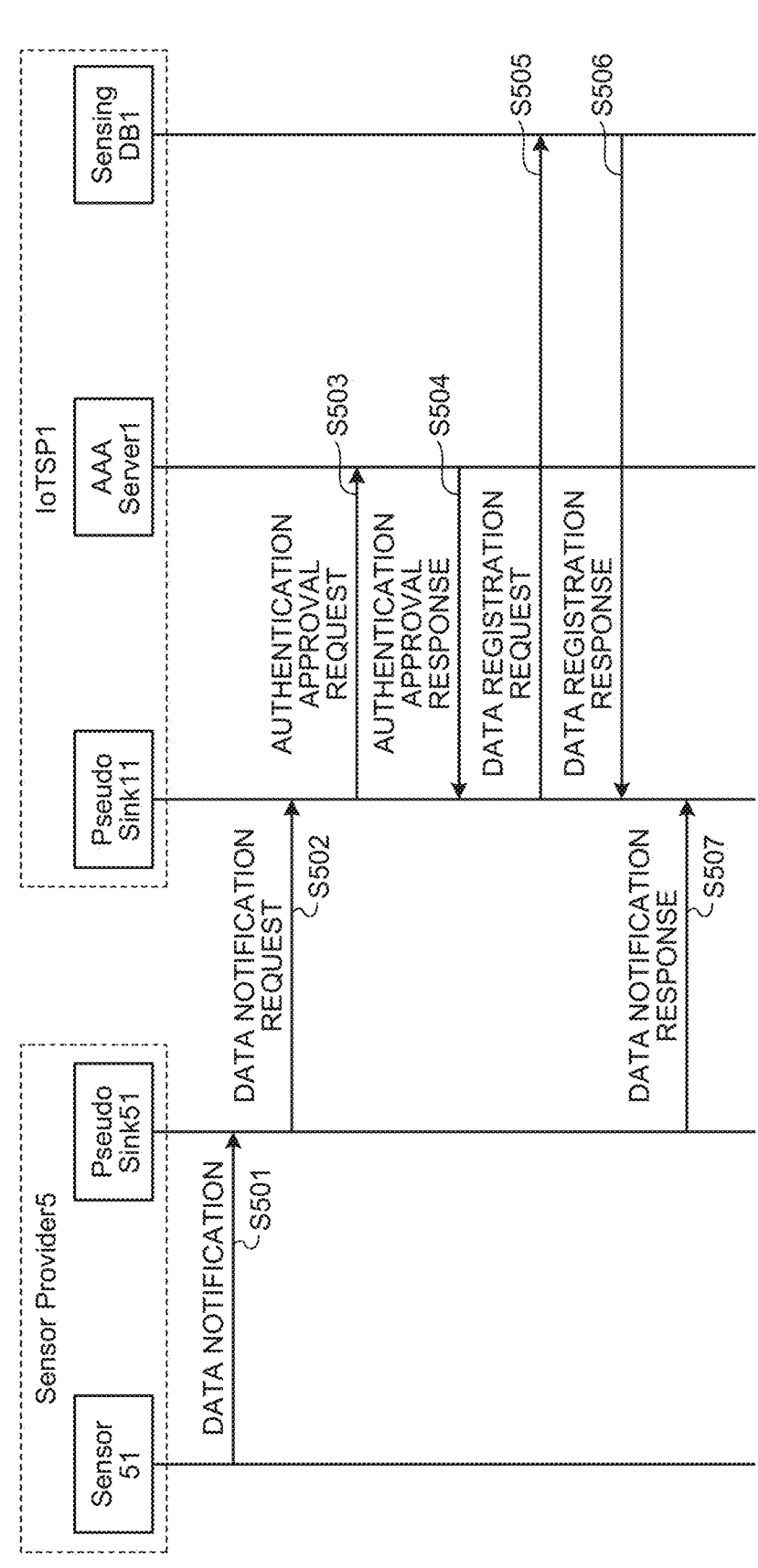
FIG. 37 is a diagram illustrating a sensor data notification procedure from a Node (2).

Next, in FIG. 5, a procedure in which a sensor 51 installed in the sensor provider 5 registers measurement data in the IoTSP 1 is illustrated in FIG. 37. FIG. 37 is a diagram illustrating a sensor data notification procedure from a Node (2). The notification procedure (2) indicates a data notification procedure from the sensor provider 1 to the IoTSP 1.

The Sensor 51 periodically transmits measurement data such as temperature to the Pseudo Sink 51 in a data notification message (Step S501). It is assumed that communication between the Sensor 51 and the Pseudo Sink 51 is secure. FIG. 38 illustrates the data notification message. A value of a Node ID field is "IdNode_51". A Timestamp field indicates a date and time when sensor data was measured and is "Feb. 8, 2021, 10:00:00" in this example. A Data Format ID field represents an identifier of a format of data stored in a Data field. Sensor data is stored in the Data field.

When receiving the data notification message, the Pseudo Sink 51 transmits a data notification request message to the Pseudo Sink 11 in the IoTSP 1 (Step S502). FIG. 39 illustrates the data registration request message. A value of a Sensor Provider ID field is "IdSensP_5". A value of a Credential field is "CredSensP_5". Values of a Node ID field, a Timestamp field, a Data Format ID field, and a Data field are the same as those of the data notification message illustrated in FIG. 38.

When receiving the data registration request message, the Pseudo Sink 11 transmits an authentication approval request message to the AAA Server 1 in the IoTSP 1 (Step S503).

FIG. 40 illustrates the authentication approval request message. A value of an ID field is "IdSensP_5". A value of a Credential field is "CredSensP_5".

When receiving the authentication approval request message, the AAA Server 1 checks authenticity and authority of an entity indicated by an ID field. If the check is successful, the AAA Server 1 transmits an authentication approval response message to the Pseudo Sink 11 (Step S504). FIG. 13 illustrates an authentication approval response message.

When receiving the authentication approval response message, the Pseudo Sink 11 transmits a data registration request message to the Sensing DB 1 (Step S505). FIG. 41 illustrates a data registration request message. Values of a Node ID field, a Timestamp field, a Data Format ID field, and a Data field are the same as those of the data notification message illustrated in FIG. 38.

When receiving the data registration request message, the Sensing DB 1 stores data in a database and transmits a data registration response message to the Pseudo Sink 11 (Step S506). FIG. 36 illustrates the data registration response message.

Figures 42, 43:
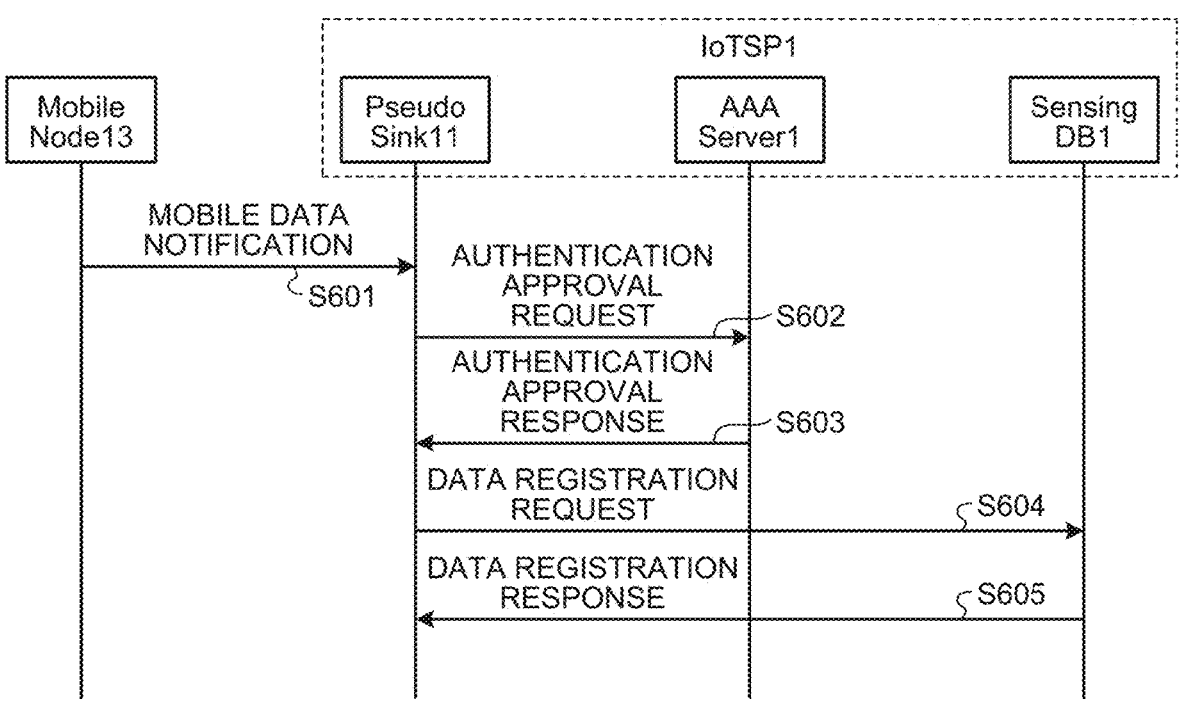
FIG. 42 is a diagram illustrating a structure example of a data notification response message.
FIG. 43 is a diagram illustrating a sensor data notification procedure from a Node (3).

When receiving the data registration response message, the Pseudo Sink 11 transmits a data notification response message to the Pseudo Sink 51 (Step S507). FIG. 42 illustrates the data notification response message. A Status field is OK indicating a normal end.

(1.4.13. Sensor Data Notification from a Node (3))

Next, in FIG. 5, a procedure in which the Mobile Node 13 having a contract with the IoTSP1 registers the measurement data in the IoTSP1 is illustrated in FIG. 43. FIG. 43 is a diagram illustrating a sensor data notification procedure from a Node (3). The notification procedure (3) indicates a data notification procedure from the Mobile Node 13 to the IoTSP 1.

The Mobile Node 13 detects that the Mobile Node 13 has entered a wireless communication range of the Pseudo Sink 11 in the IoTSP 1 with which the Mobile Node 13 has a contract and transmits measurement data to the Pseudo Sink 11 with a mobile data notification message (Step S601). FIG. 44 illustrates a mobile data notification message. A value of a Node ID field is "IdNode_13". A value of a Credential field is "CredNode_13". A Timestamp field represents a date and time when sensor data is transmitted and is "Feb. 8, 2021, 10:00:00" in this example. A Lat field represents the latitude of the Mobile Node 13 at the time when the sensor data is transmitted and is "35 degrees, 37, minutes, 12 seconds north latitude" in this example. A Lon field represents the longitude of the Mobile Node 13 at the time when the sensor data is transmitted and is "139 degrees, 43 minutes, 41 seconds east longitude" in this example. A Data Format ID field represents an identifier of a format of data stored in a Data field. Sensor data is stored in the Data field.

When receiving the mobile data notification message, the Pseudo Sink 11 transmits an authentication approval request message to the AAA Server 1 (Step S602). FIG. 45 illustrates the authentication approval request message. A value of an ID field is "IdNode_13". A value of a Credential field is "CredNode_13".

When receiving the authentication approval request message, the AAA Server 1 checks authenticity and authority of an entity indicated by an ID field. If the check is successful, the AAA Server 1 transmits an authentication approval response message to the Pseudo Sink 11 (Step S603). FIG. 13 illustrates an authentication approval response message.

When receiving the authentication approval response message, the Pseudo Sink 11 transmits a data registration request message to the Sensing DB 1 (Step S604). FIG. 46 illustrates the data registration request message.

When receiving the data registration request message, the Sensing DB 1 registers data and transmits a data registration response message to the Pseudo Sink 11 (Step S605). FIG. 36 illustrates the data registration response message. Values of a Node ID field, a Timestamp field, a Data Format ID field, and a Data field are the same as those of the mobile data notification message illustrated in FIG. 44.

(1.4.14. Data Acquisition by an IoT App)

Figure 47:
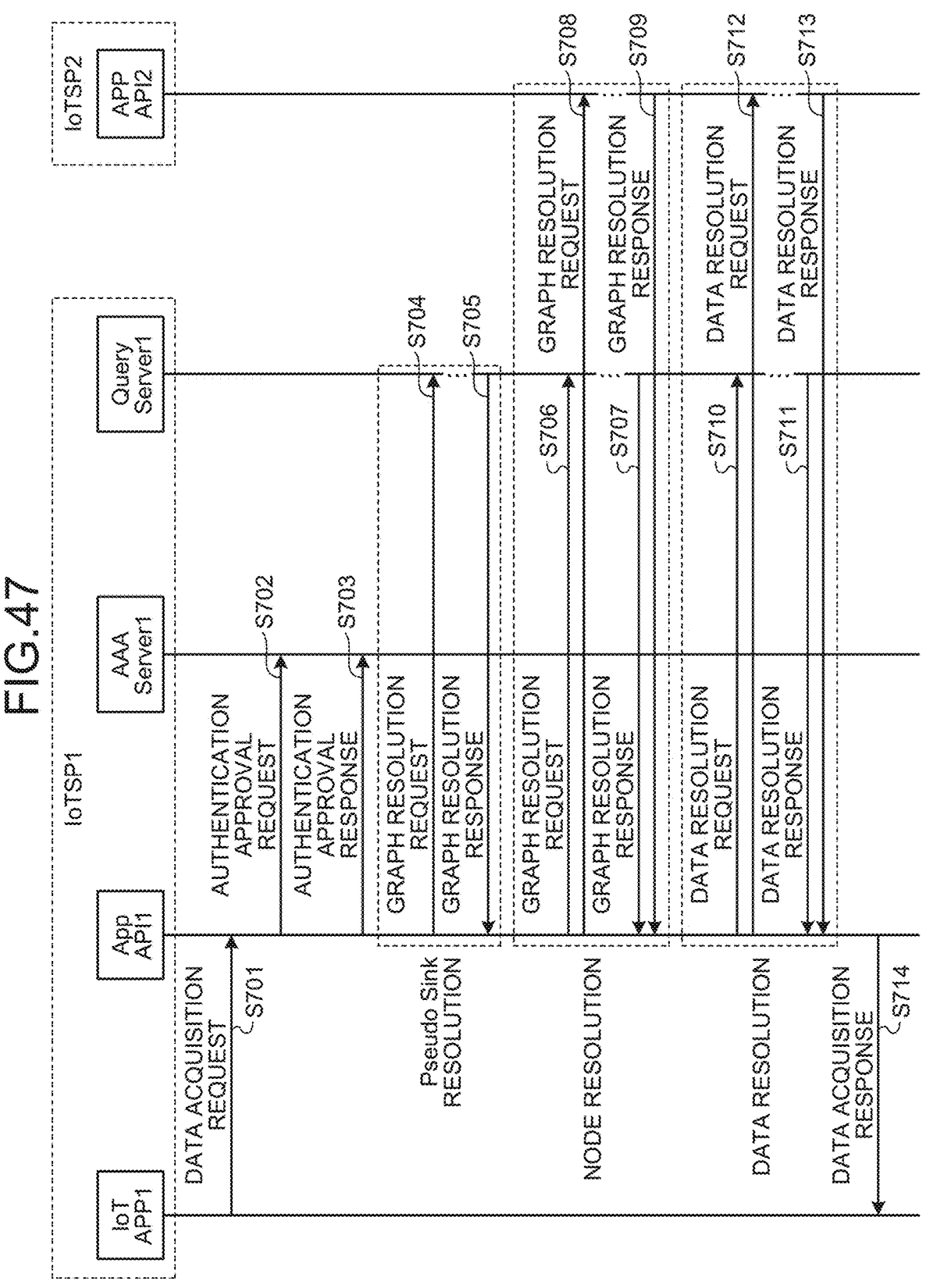
FIG. 47 is a diagram illustrating a data acquisition procedure by IoT APP.

In FIG. 5, an IoT App 1 is an application for acquiring sensor data via the App API 1. FIG. 47 illustrates a procedure in which the IoT App 1 acquires data. FIG. 47 is a diagram illustrating a data acquisition procedure by an IoT APP. As an example, a procedure in the case in which the App API 1 (that is, the User 1) designates a range of a solid line illustrated in FIG. 48 and acquires temperature data from 0:00:00 to 23:59:59 on Feb. 10, 2021 is explained.

The IoT App 1 transmits a data acquisition request message to the App API 1 (Step S701). FIG. 49 illustrates a data acquisition request message. The value of an ID field is "IdUser_1". A value of a Credential field is "CredUser_1". Values of an SW Lat field, an SW Long field, an NE Lat field, and an NE Long field are respective "35 degrees, 37 minutes, 09 seconds north latitude", "139 degrees, 43 minutes, 21 seconds east longitude", "35 degrees, 37 minutes, 39 seconds north latitude", and "139 degrees, 43 minutes, 45 seconds east longitude". A value of a Capability field is "temperature". Values of a Start Time field and an End Time field are respectively "Feb. 10, 2021, 0:00:00" and "Feb. 10, 2021, 23:59:59".

When receiving the data acquisition request message, the App API 1 transmits an authentication approval request message to the AAA Server 1 (Step S702). FIG. 50 illustrates an authentication approval request message. The value of an ID field is "IdUser_1". A value of a Credential field is "CredUser_1".

When receiving the authentication approval request message, the AAA Server 1 checks authenticity and authority of an entity indicated by the ID field. When the check is successful, the AAA Server 1 transmits an authentication approval response message to the App API 1 (Step S703). FIG. 13 illustrates an authentication approval response message.

When receiving the authentication approval response message, the App API 1 performs Pseudo Sink resolution (Steps S704 and S705). Details of the Pseudo Sink resolution procedure are explained below. As a result, the App API 1 obtains a list of Pseudo Sink instance data present in an area where the IoT App 1 is requesting data acquisition. In this example, the App API 1 obtains the instance data of the Pseudo Sink 11 illustrated in FIG. 16 and the instance data of the Pseudo Sink 21 illustrated in FIG. 19.

Subsequently, the App API 1 executes node resolution (Steps S706 to S709). Details of the node resolution procedure are explained below. As explained above, an interface between the App API 1 and the Query Server 1 and an interface between the App API 1 and the App API 2 are the same. As a result of the node resolution, the App API 1 obtains a list of Node instance data present in an area where the IoT App 1 is requesting data acquisition. In this example, the App API 1 obtains the instance data of the Node 11 illustrated in FIG. 10, the instance data of the Node 12 illustrated in FIG. 11, and the instance data of the Node 21 illustrated in FIG. 20.

Subsequently, the App API 1 executes data resolution (Steps S710 to S713). Details of a data search procedure are explained below. As explained above, an interface between the App API 1 and the Query Server 1 and an interface between the App API 1 and the App API 2 are the same. As a result of the data resolution, the App API 1 can obtain temperature data measured by the Node 11, the Node 12, and the Node 13.

Figure 51:
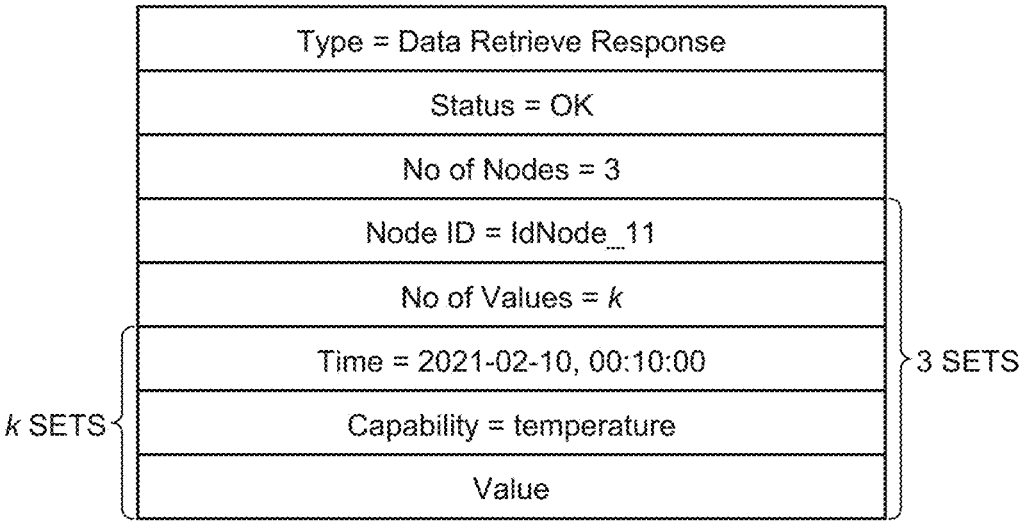
FIG. 51 is a diagram illustrating a structure example of a data acquisition response message.

Subsequently, the App API 1 transmits a data acquisition response to the IoT App 1 (Step S714). FIG. 51 illustrates an example of a data acquisition response message. A No of Nodes field indicates the number of Nodes that acquired sensor values and, in this example, three Node 11, Node 12, and Node 21. In the following explanation, three sets of a Node ID field, a No of Values field, and a Value field follow. The Node ID field indicates an identifier of a Node that acquired a sensor value. The Capability field indicates a function of the Node. The Value field represents a sensor value.

(1.4.15. Pseudo Sink Resolution Procedure)

Figure 52:
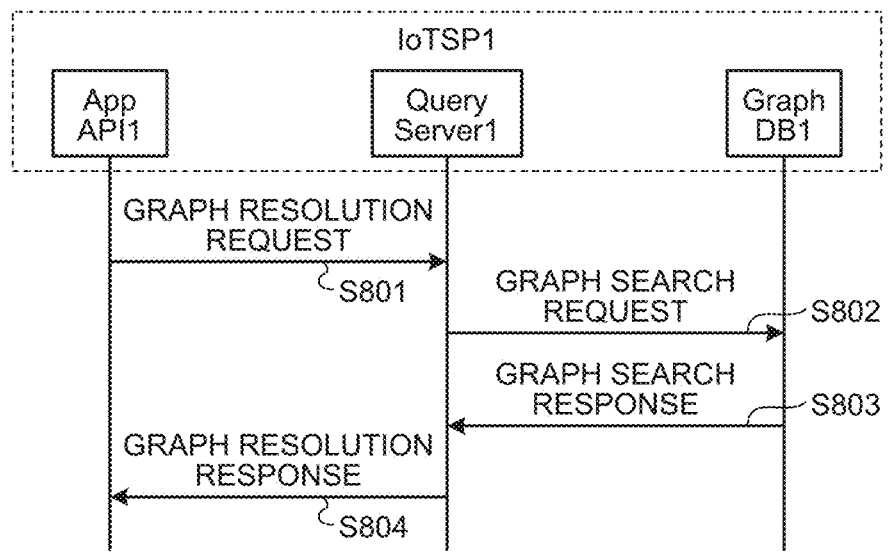
FIG. 52 is a diagram illustrating a graph resolution procedure.

Pseudo Sink resolution illustrated in FIG. 47 is processing for searching Pseudo Sink present in a designated Area and is a type of graph search. The Pseudo Sink resolution procedure is explained using a graph resolution procedure illustrated in FIG. 52. FIG. 52 is a diagram illustrating the graph resolution procedure.

The App API 1 transmits a graph resolution request message to the Query Server 1 (Step S801). FIG. 53 illustrates a graph resolution request message. An IoTSP ID field represents an identifier of an IoTSP that performs graph resolution and is "IdIoTSP_1" in this example. A No of Queries field represents the number of Queries and is "30" in this example. This is the number of Areas illustrated in FIG. 48. The thirty Queries are contents of searching Pseudo Sink instances connected by an object property of contains for respective Areas.

When receiving the graph resolution request message, the Query Server 1 transmits a graph search request message to the Graph DB 1 (Step S802). FIG. 54 illustrates a graph search request message. Values of the No of Queries field and the Query field are the same as those of the graph resolution request message illustrated in FIG. 53.

When receiving the graph search request message, the Graph DB 1 performs a search indicated by a Query field with respect to a database. Subsequently, the Graph DB 1 transmits a graph search response to the App API 1 and notifies the result of the search (Step S803). FIG. 55 illustrates a graph search response message. The Status field is "OK" indicating a normal end. Since there are the thirty Query fields in the graph search request message in this example, the graph search response message includes thirty Value fields. In this example, the content of the Pseudo Sink 11 illustrated in FIG. 16 is returned as a Value for a Query concerning the Area 11. The content of the Pseudo Sink 21 illustrated in FIG. 19 is returned as a Value for a Query concerning the Area 21. Values for Queries concerning the other Areas are empty.

When receiving the graph search response message, the Query Server 1 transmits a graph resolution response message to the App API 1 (Step S804). FIG. 56 illustrates the graph resolution response message. The Status field is "OK" indicating a normal end. Values of the No of Values field and the Value field are the same as those of the graph search response message illustrated in FIG. 55. As a result, the App API 1 obtains the instance data of the Pseudo Sink 11 illustrated in FIG. 16 and the instance data of the Pseudo Sink 21 illustrated in FIG. 19.

(1.4.16. Node Resolution Procedure)

Figures 57, 58:
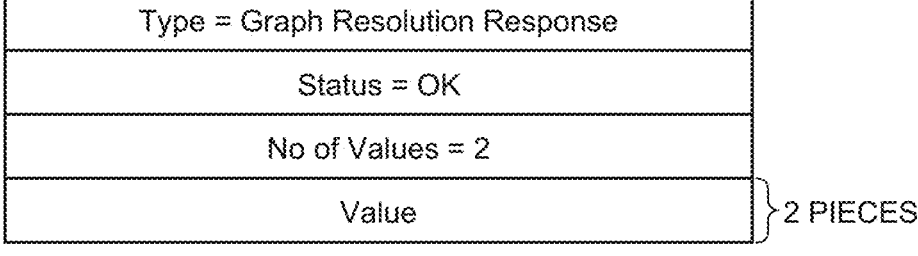
FIG. 57 is a diagram illustrating a structure example of a graph resolution request message (2).
FIG. 58 is a diagram illustrating a structure example of a graph resolution response message (2).

The node resolution illustrated in FIG. 47 is processing for searching a node satisfying a condition designated in a designated Pseudo Sink and is a type of graph search. The App API 1 first performs node resolution on the Pseudo Sink 11 according to the procedure illustrated in FIG. 52. FIG. 57 illustrates a graph resolution request message transmitted by the App API 1. A value of an IoTSP ID field is "IdIoTSP_1". A value of a No of Queries field is "1". Content of a Query field is searching a node installed in the Pseudo Sink 11 and capable of measuring temperature. As a result, the App API 1 receives a graph resolution response message illustrated in FIG. 58. The Status field is "OK" indicating a normal end. A value of a No of Values field is "2". A Value field includes the instance data of the Node 11 and the Node 12 illustrated in FIG. 10 and FIG. 11.

Figure 59:
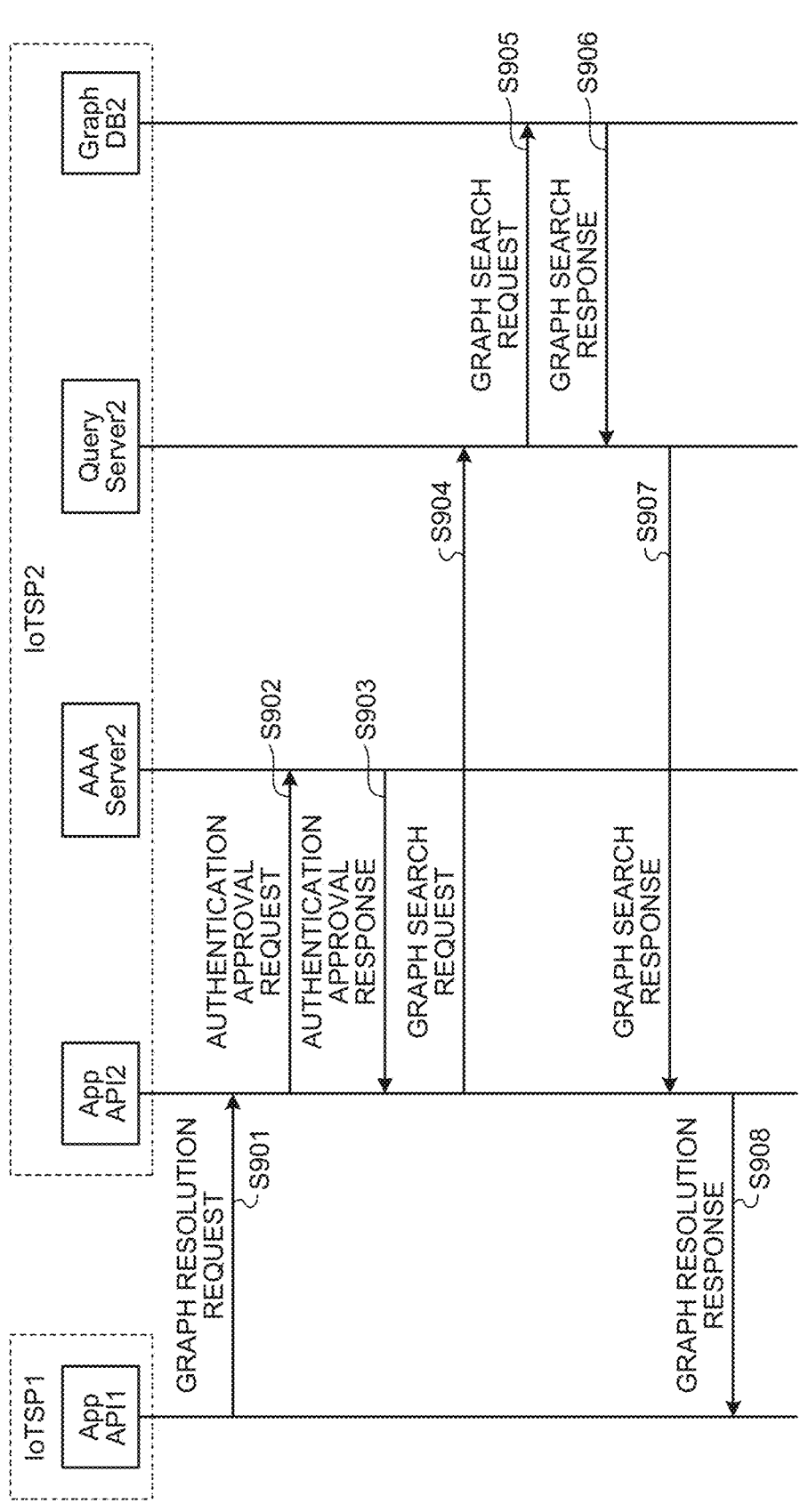
FIG. 59 is a diagram illustrating a graph search procedure.

Subsequently, the App API 1 performs node resolution for the Pseudo Sink 21 according to a procedure illustrated in FIG. 59. FIG. 59 is a diagram illustrating a graph search procedure.

The App API 1 transmits a graph resolution request message to the App API 2 in the IoTSP2 (Step S901). FIG. 60 illustrates the graph resolution request message. A value of an ID field is "IdIoTSP_1". A value of a Credential field is "CredIoTSP_1". A value of an IoTSP ID field is "IdIoTSP_2". A value of a No of Queries field is "1". Content of a Query field is searching a node installed in the Pseudo Sink 21 and capable of measuring temperature.

When receiving the graph resolution request message, the App API 2 transmits an authentication approval request message to the AAA Server 2 (Step S902). FIG. 61 illustrates an authentication approval request message. A value of an ID field is "IdIoTSP_1". A value of a Credential field is "CredIoTSP_1".

When receiving the authentication approval request message, the AAA Server 2 checks authenticity and authority of an entity indicated by the ID field. When the check is successful, the AAA Server 2 transmits an authentication approval response message to the App API 2 (Step S903). FIG. 13 illustrates an authentication approval response message.

Figures 62, 63:
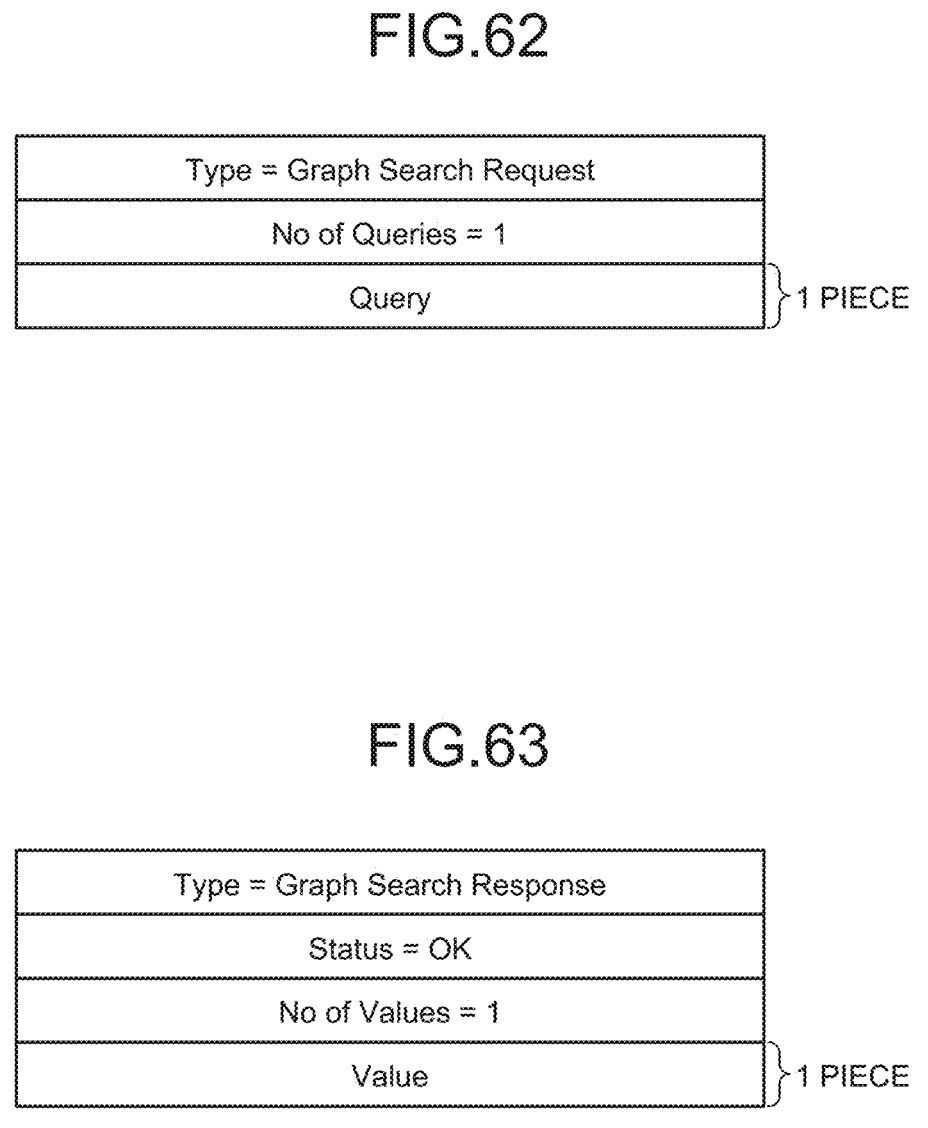

When receiving the authentication approval response message, the App API 2 transmits a graph search request message to the Query Server 2 (Step S904). FIG. 62 illustrates the graph search request message. A value of a No of Queries field is "1". Content of a Query field is searching a node installed in the Pseudo Sink 21 and capable of measuring temperature.

When receiving the graph search request message, the Query Server 2 transmits the graph search request message to the Graph DB 2 (Step S905).

When receiving the graph search request message, the Graph DB 2 performs a search indicated by the Query field on a database. Subsequently, the graph DB 2 transmits a graph search response to the Query Server 2 and notifies a result of the search (Step S906). FIG. 63 illustrates a graph search response message. The Status field is "OK" indicating a normal end. In this example, since there is one Query field in the graph search request message, a value of a No of Values field is "1". A value of a Value field is instance data of the Node 21 illustrated in FIG. 20.

When receiving the graph search response message, the Query Server 2 transmits the graph search response message to the App API 2 (Step S907).

Figure 64:
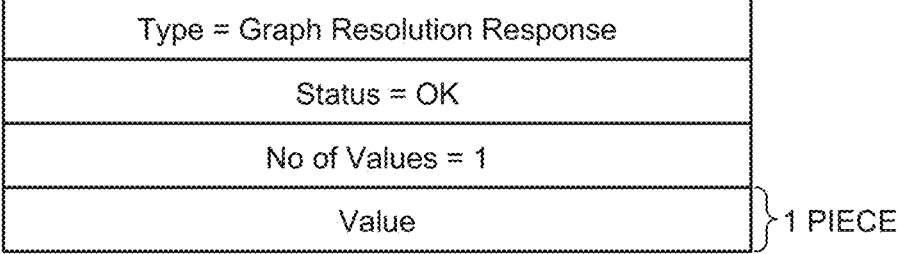
FIG. 64 is a diagram illustrating a structure example of a graph resolution response message (3).

When receiving the graph search response message, the App API 2 transmits a graph resolution response message to the App API 1 (Step S908). FIG. 64 illustrates a graph resolution response message. A value of a Status field is "OK" indicating a normal end. Values of a No of Values field and a Value field are the same as those of the graph search response message illustrated in FIG. 63.

As explained above, an interface between the App API 1 and the App API 12 (Steps S901 and S908) and an interface between the App API 2 and the Query Server 2 (Steps S904 and S907) are the same.

(1.4.17. Data Resolution Procedure (1))

Figure 65:
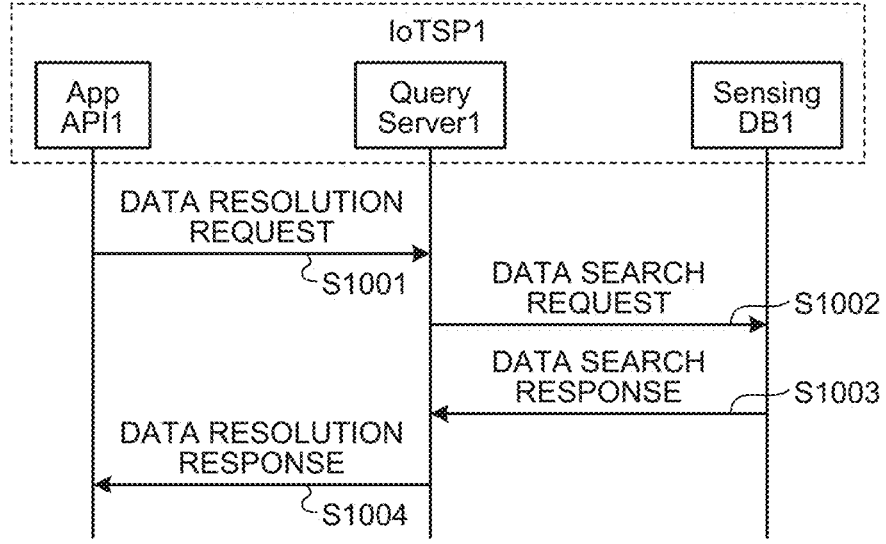
FIG. 65 is a diagram illustrating a data resolution procedure (1).

The data resolution illustrated in FIG. 47 is processing for acquiring a measurement value from a designated Node, a measurement item, and a measurement time. The App API 1 acquires temperature data from the Node 11 and the Node 12 in the data resolution procedure illustrated in FIG. 65. FIG. 65 is a diagram illustrating a data resolution procedure (1).

The App API 1 transmits a data resolution request to the Query Server 1 (Step S1001). FIG. 66 illustrates a data resolution request message. A value of an IoTSP ID field is "IdIoTSP_1". A value of a No of Queries field is "2". In the following explanation, two sets of four field of a Node ID field, a Capability field, a Start Time field, and an End Time field follow. In a first set of four fields, a value of the Node ID field is "IdNode_11". A value of a Capability field is "temperature". A value of the Start Time field is "Feb. 10, 2021, 0:00:00". A value of the End Time field is "Feb. 10, 2021, 23:59:59". In a second set of four fields, a value of the Node ID field is "IdNode_12" and values of the other fields are the same as above.

When receiving the data resolution request message, the Query Server 1 transmits a data search request message to the Sensing DB 1 (Step S1002). FIG. 67 illustrates the data search request message. Values of a No of Queries field, a Node ID field, a Capability field, a Start Time field, and an End Time field are the same as those of the data resolution request message illustrated in FIG. 66.

Figures 68, 69:
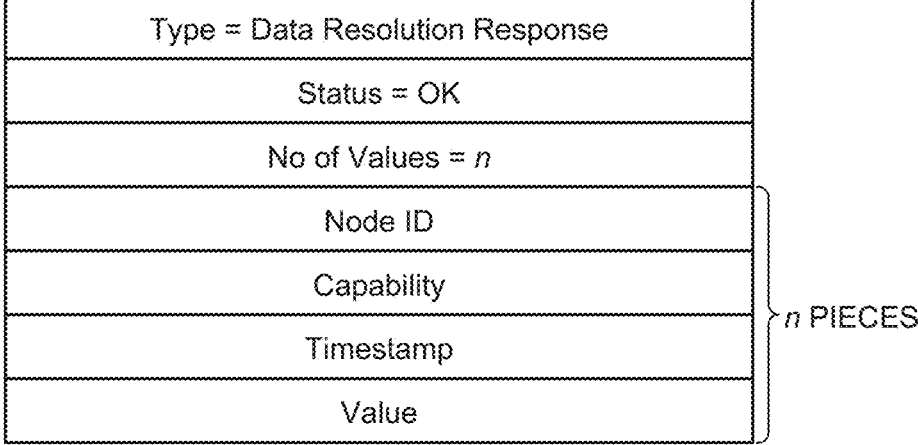
FIG. 68 is a diagram illustrating a structure example of a data search response message.
FIG. 69 is a diagram illustrating a structure example of a data resolution response message.

When receiving the data search request message, the Sensing DB 1 performs a search indicated by the Query field on a database. Subsequently, the Sensing DB 1 transmits a data search response to the Query Server 1 and conveys a result of the search (Step S1003). FIG. 68 illustrates a data search response message. The Status field is "OK" indicating a normal end. A No of Values field indicates the number of answer data. In the following explanation, four fields of a Node ID field, a Capability field, a Timestamp field, and a Value field continue by the number of values of the No of a Values field.

When receiving the data search response message, the Query Server 1 transmits a data resolution response message to the App API 1 (Step S1004). FIG. 69 illustrates the data resolution response message. Fields other than the Type field are the same as the fields of the data resolution response message illustrated in FIG. 68.

(1.4.18. Data Resolution Procedure (2))

Figure 70:
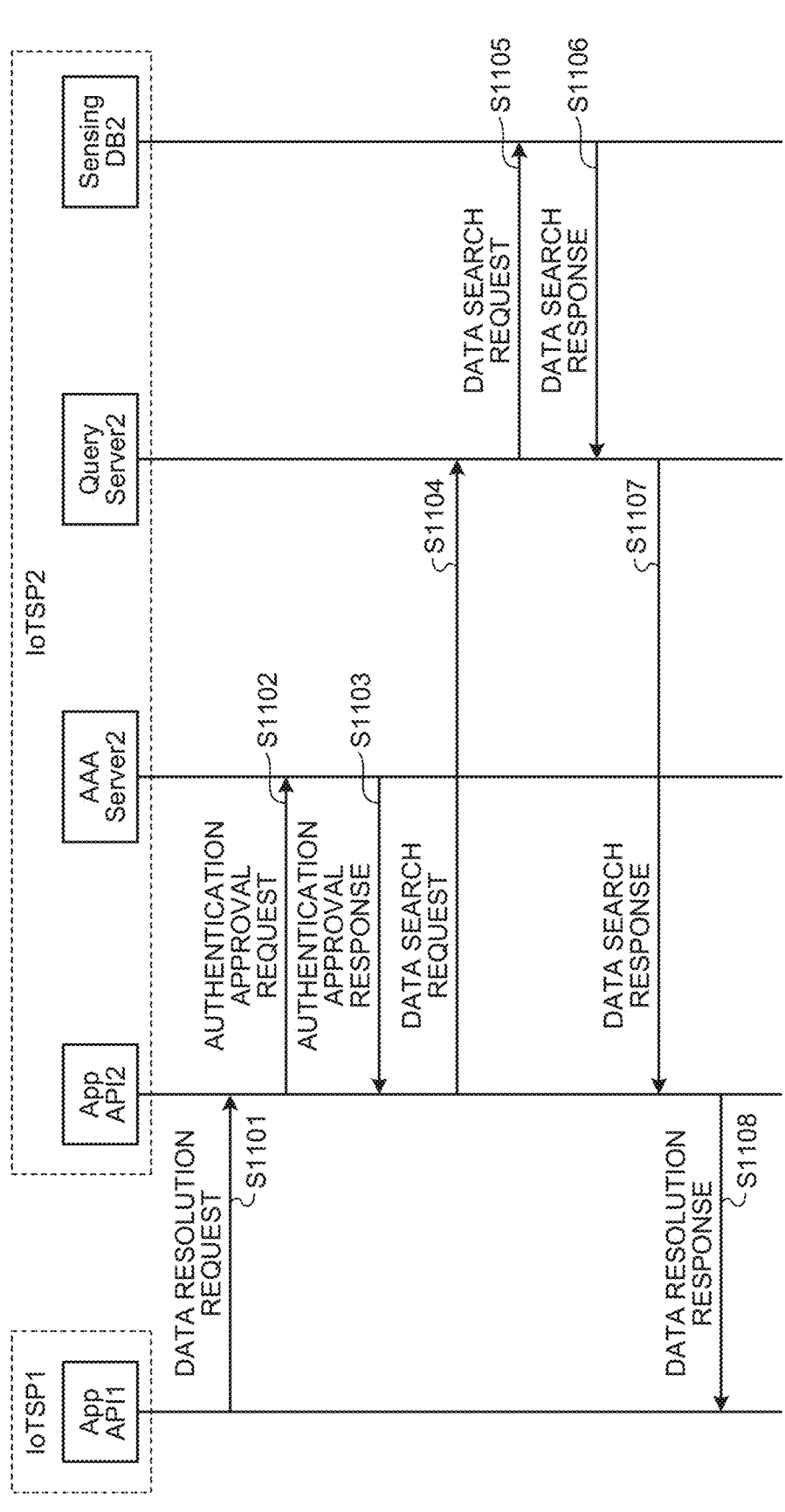
FIG. 70 is a diagram illustrating a data resolution procedure (2).

Subsequently, the App API 1 acquires temperature data from the Node 21 in a data resolution procedure illustrated in FIG. 70. FIG. 70 is a diagram illustrating a data resolution procedure (2).

The App API 1 transmits a data resolution request message to the Query Server 1 (Step S1101). FIG. 71 illustrates the data resolution request message. A value of an ID field is "IdIoTSP_1". A value of a Credential field is "CredIoTSP_1". A value of an IoTSP ID field is "IdIoTSP_2". A value of a No of Queries field is "1". A value of a Node ID field is "IdNode_21". A value of a Capability field is "temperature". A value of the Start Time field is "Feb. 10, 2021, 0:00:00". A value of the End Time field is "Feb. 10, 2021, 23:59:59".

When receiving the data resolution request message, the App API 2 transmits an authentication approval request message to the AAA Server 2 (Step S1102). FIG. 61 illustrates an authentication approval request message.

When receiving the authentication approval request message, the AAA Server 2 checks authenticity and authority of an entity indicated by the ID field. When the check is successful, the AAA Server 2 transmits an authentication approval response message to the App API 2 (Step S1103). FIG. 13 illustrates an authentication approval response message.

When receiving the authentication approval response message, the App API 2 transmits a data search request message to the Query Server 2 (Step S1104). FIG. 72 illustrates the data search request message. Values of a No of Queries field, a Node ID field, a Capability field, a Start Time field, and an End Time field are the same as those of the data resolution request message illustrated in FIG. 71.

When receiving the data search request message, the Query Server 2 transmits the data search request message to the Sensing DB 2 (Step S1105).

When receiving the data search request message, the Sensing DB 2 performs a search indicated by a Query field on a database. Subsequently, the Sensing DB2 transmits a data search response to the Query Server 2 to convey a result of the search (Step S1106). FIG. 68 illustrates a data search response message.

When receiving the data search response message, the Query Server 2 transmits the data search response message to the App API 2 (Step S1107).

When receiving the data search response message, the App API 2 transmits a data resolution response message to the App API 1 (Step S1108). FIG. 69 illustrates the data resolution response message.

As explained above, an interface between the App API 1 and the App API 2 (Steps S1101 and S1108) and an interface between the App API 2 and the Query Server 2 (Steps S1104 and S1107) are the same.

The embodiment of the present disclosure is explained above. Subsequently, a functional configuration example of an information processing apparatus that can function as an IoTSP, a node, a module, and the like according to the embodiment of the present disclosure is explained.

[1.5. Functional Configuration Example of an Information Processing Apparatus]

Figure 73:
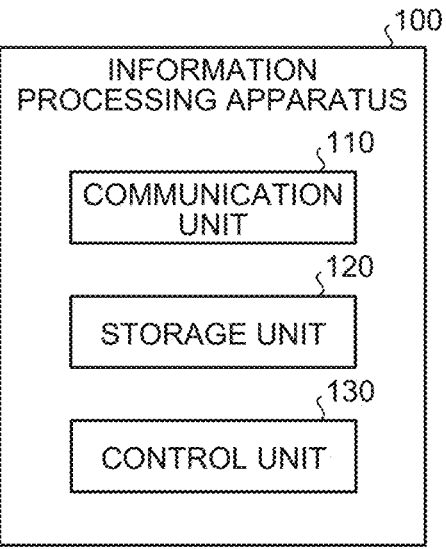
FIG. 73 is an explanatory diagram illustrating a functional configuration example of an information processing apparatus according to an embodiment of the present disclosure.

FIG. 73 is an explanatory diagram illustrating a functional configuration example of an information processing apparatus 100 according to the embodiment of the present disclosure. Note that FIG. 73 illustrates a functional conceptual configuration of the information processing apparatus 100 that is a computer that can function as an IoTSP, a node, a module, and the like and does not impose physical restrictions on the configuration of the information processing apparatus 100. Therefore, the information processing apparatus 100 may be physically configured by one apparatus or may be physically configured by a plurality of apparatuses. When being constituted by the plurality of apparatuses, the apparatuses may be interspersed in various places. When the information processing apparatus 100 is configured by the plurality of apparatuses, the apparatuses may respectively function as individual information processing apparatuses 100 or may virtually function as one information processing apparatus 100.

The same applies to a communication unit 110, a storage unit 120, and a control unit 130 explained below. For example, specific forms of distribution and integration of blocks are not limited to illustrated forms. All or a part of the blocks can be configured by being functionally or physically distributed and integrated in any units according to various loads, use situations, and the like.

As illustrated in FIG. 73, the information processing apparatus 100 includes a communication unit 110, a storage unit 120, and a control unit 130.

The communication unit 110 executes communication with other information processing apparatuses 100, for example, communication with other IoTSPs if the information processing apparatus 100 is regarded as one IoTSP. A communication form may be wired or may be wireless. From the communication unit 110, the messages and the like explained above are transmitted from a predetermined port and received in a predetermined port to and from the other information processing apparatuses 100 under control of the control unit 130.

The storage unit 120 stores various kinds of information and programs used in the architecture of the IoTSP cooperation explained above. For example, the storage unit 120 stores the Graph DB, the Sensing DB, and the like explained above. For example, the storage unit 120 stores an information processing program according to the embodiment of the present disclosure. The storage unit 120 can be configured by a semiconductor memory element such as a RAM (Random Access Memory) or a flash memory, a storage device such as a hard disk or an optical disk, an auxiliary storage device such as an SSD (Solid State Drive), or the like.

The control unit 130 is configured by, for example, a processor such as a CPU (Central Processing Unit). The information processing program according to the embodiment of the present disclosure stored in the storage unit 120 is executed using the RAM as a work area, whereby the control unit 130 executes various kinds of processing based on the architecture of the IoTSP cooperation explained above. For example, the control unit 130 executes installation processing for a Node, removal processing for a Node, notification processing for a configuration change among IoTSPs, sensor data notification processing from a Node, data acquisition processing by an IoT App, pseudo Sink resolution processing, node resolution processing, data resolution processing, and the like based on various requests and the like of the user, that is, the User 1 or the Admin 1 or automatically.

For example, the control unit 130 searches sensor data from other IoTSPs via the communication unit 110 based on identifiers of the other IoTSPs included in an acquisition request of the user via an application and policy information indicating propriety of information sharing among the IoT-SPs and uses a protocol interface including the same procedure as a procedure between the application and the IoTSP 1 when searching the sensor data.

Note that the user makes various requests to the information processing apparatus 100 via, for example, a not-illustrated user terminal.

The user terminal is a terminal apparatus used by the user. The user terminal is, for example, an information processing apparatus such as a mobile phone including a smartphone, a tablet terminal, a desktop PC, a notebook PC, or a personal digital assistant (PDA). The user terminal also includes a wearable device that is an eyeglass-type or watch-type information processing terminal.

The user terminal acquires various kinds of information according to operation by the user or a function (for example, a function of executing an application for using services provided by IoTSPs and a browser function) of the user terminal and generates and transmits information corresponding to the acquired information.

Figure 48:
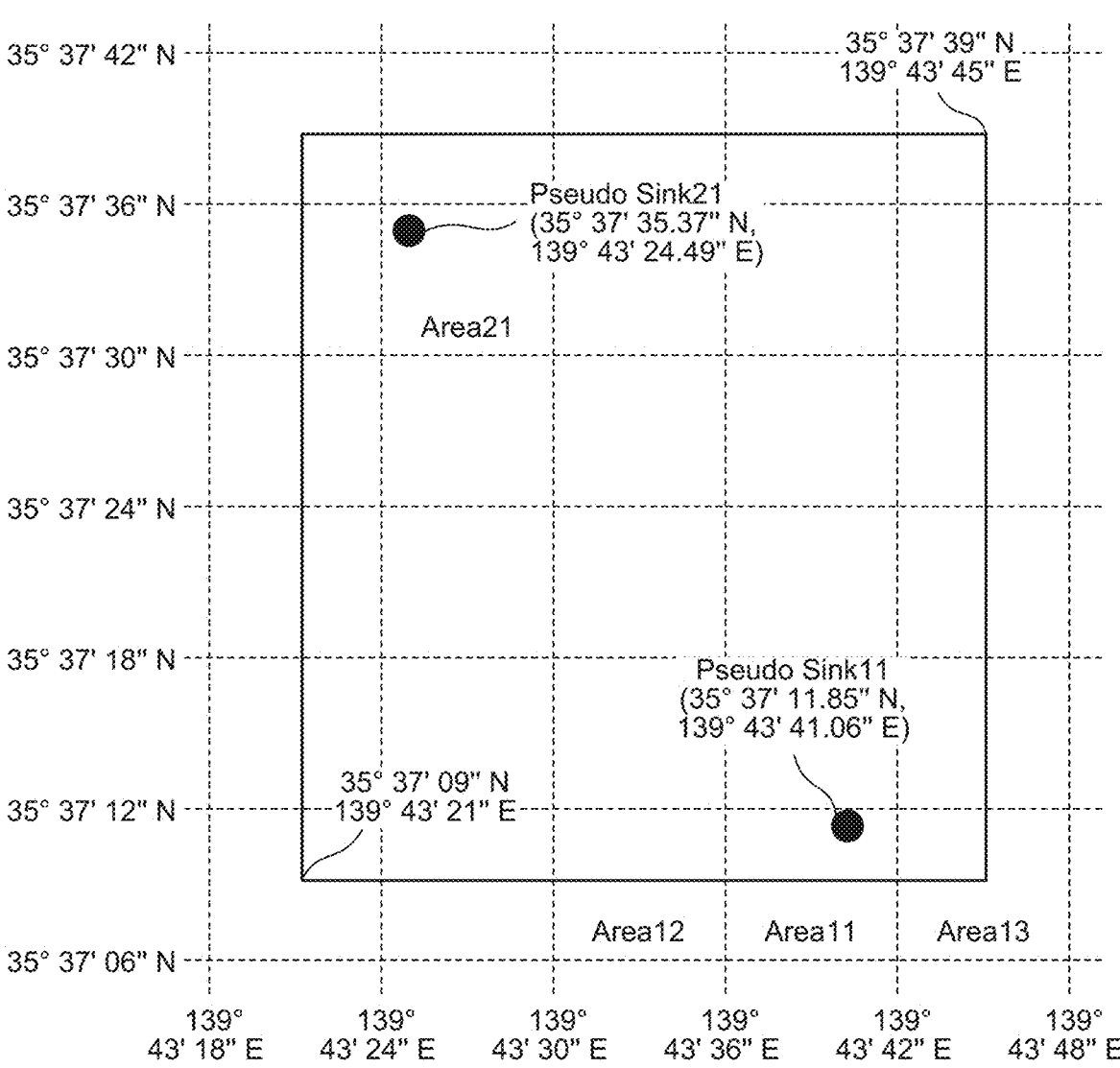
FIG. 48 is a diagram illustrating an example of a search range.

For example, in the data acquisition processing by the IoT APP, the user terminal presents a range designation screen of an area and causes the User 1 to designate the range of the solid line illustrated in FIG. 48.

2. Summary

As explained above, according to the embodiment of the present disclosure, an information processing apparatus capable of easily implementing cooperation among IoTSPs is provided.

The steps in the processing executed by the apparatuses in the present specification do not always need to be processed in time series according to the order described as the sequence charts or the flowcharts. For example, the steps in the processing executed by the apparatuses may be processed in order different from the order described as the flowcharts or may be processed in parallel.

It is also possible to create a computer program for causing hardware such as CPUs, ROMs (Read Only Memories), and RAMs (Random Access Memories) incorporated in the apparatuses to exert functions equivalent to the configurations of the apparatuses explained above. A storage medium storing the computer program can also be provided. By configuring the respective functional blocks illustrated in the functional block diagrams with hardware, a series of processing can be realized by the hardware.

The preferred embodiments of the present disclosure are explained in detail above with reference to the accompanying drawings. However, the technical scope of the present disclosure is not limited to such examples. It is obvious that a person having ordinary knowledge in the technical field of the present disclosure can conceive various change examples or correction examples within the category of the technical idea described in the claims. It is naturally understood that the change examples and the correction examples also belong to the technical scope of the present disclosure.

[2.1. Effects]

As explained above, the information processing apparatus 100 according to the embodiment of the present disclosure is an information processing apparatus that operates as the IoTSP 1 (equivalent to an example of the "first IoTSP") that provides a service for causing a user to acquire sensor data, the information processing apparatus including the communication unit 110 that executes communication with the other IoTSPs (equivalent to an example of the "second IoTSP other than the first IoTSP") and the control unit 130 that searches the sensor data corresponding to an acquisition request of the user via an application and responds to the user with the searched sensor data. The control unit 130 searches the sensor data from the other IoTSPs via the communication unit 110 based on identifiers of the other IoTSPs included in the acquisition request and policy information indicating propriety of information sharing among the IoTSPs, and uses a protocol interface including the same procedure as a procedure between the application and the IoTSP1 when searching the sensor data.

Therefore, with the information processing apparatus 100 according to the embodiment of the present disclosure, IoTSP cooperation can be easily implemented.

That is, with the information processing apparatus 100 according to the embodiment of the present disclosure, by unifying an interface of an IoT system (IoTSP) to a query language (for example, GraphQL), cooperation among IoT- SPs can be facilitated and a difference in implementation of the IoTSPs can be concealed.

With the information processing apparatus 100 according to the embodiment of the present disclosure, an App API is introduced between an IoT application and an IoTSP and the App API converts a request from the application into a query language, whereby the application can easily access the IoTSP. Specifically, a proposed interface is configured by an inquiry to a graph database (Graph DB) and an inquiry to a time-series database (Sensing DB). Note that a query language GraphQL and a GraphQL server are actually used.

The information processing apparatus 100 according to the embodiment of the present disclosure also considers cooperation with a sensor provider that provides only sensors. Therefore, with the information processing apparatus 100 according to the embodiment of the present disclosure, sensor data collected by the sensor provider can be stored in the Sensing DB of the IoTSP via a Pseudo Sink.

The information processing apparatus 100 according to the embodiment of the present disclosure implements cooperation among IoTSPs by sharing, among the IoTSPs, information concerning the Pseudo Sink in configuration information of the IoTSPs. The Pseudo Sink includes information concerning a place where a sensor node is installed but does not include information concerning the sensor node itself. Therefore, the Pseudo Sink is considered to be necessary minimum information that should be shared among the IoTSPs. Consequently, an amount of information exchanged among the IoTSPs is suppressed as much as possible and cooperation among the IoTSPs is enabled without excessively disclosing configuration information inside the IoTSPs.

With the information processing apparatus 100 according to the embodiment of the present disclosure, for a Pseudo Sink and a Node, the IoTSP that owns the Pseudo Sink and the Node can set a disclosure policy.

[2.2. Modifications]

Other modifications are also explained. FIG. 74 to FIG. 78 are explanatory diagrams (part 1) to (part 5) of the modifications.

In the embodiment of the present disclosure explained above, an IoTSP level is designated (for example, with values "IdIoTSP_ALL" and "except IdIoTSP_3", disclosability to all IoTSPs except the IoTSP3 is designated) in the Policy field.

Figure 74:
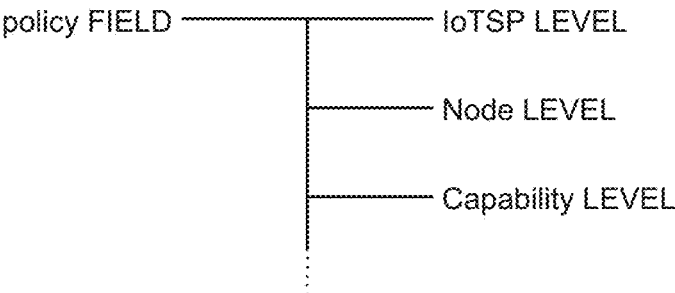
FIG. 74 is an explanatory diagram (part 1) of a modification.

However, as illustrated in FIG. 74, such designation is not limited to the IoTSP level and designation may be performed according to a data level such as a Node level or a Capability level. That is, disclosure/non-disclosure may be designated for each of Nodes in the IoTSP or disclosure/non-disclosure may be designated for each of Capability level such as "temperature" and "humidity". Consequently, it is possible to perform information protection setting at a detailed level such as for each of Nodes or each of Capability levels.

Figure 75:
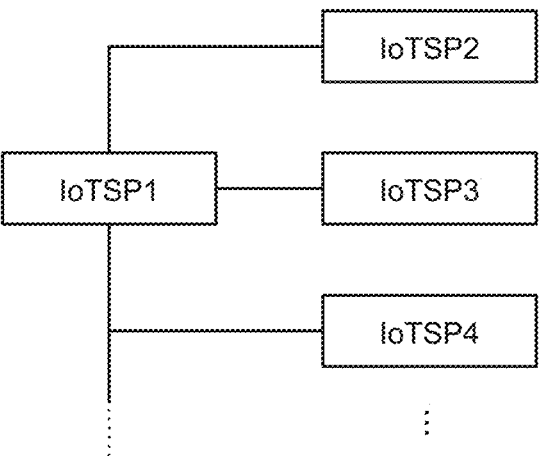
FIG. 75 is an explanatory diagram (part 2) of the modification.

According to the embodiment of the present disclosure, as illustrated in FIG. 75, for example, it is possible to perform the IoTSP without the IoTSP 1 always making one-to-one connection to the other IoTSPs 2, 3, 4 . . . , that is, without forming a mesh network.

Figure 76:
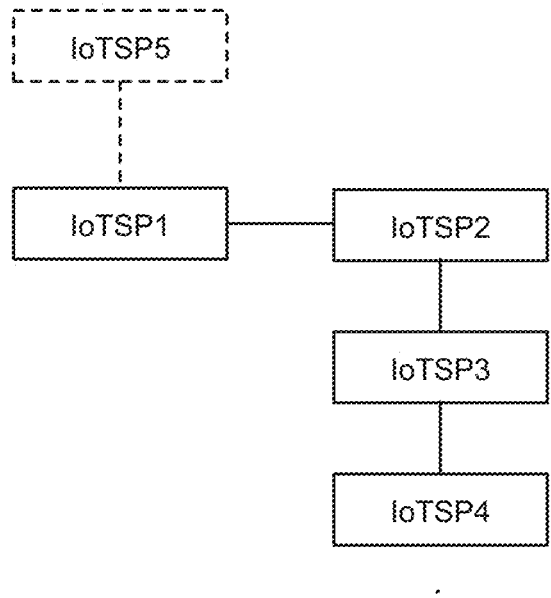
FIG. 76 is an explanatory diagram (part 3) of the modification.

That is, as illustrated in FIG. 76, the IoTSP 1 can indirectly acquire necessary sensor data from, for example, the IoTSP 4 via a straight chain-like connection relation. However, this does not always restrict acquisition of necessary sensor data directly from another IoTSP 5. Therefore, the IoTSP 1 may appropriately and directly acquire necessary sensor data according to a relation among the IoTSPs, for example, a contract relation.

Figure 77:
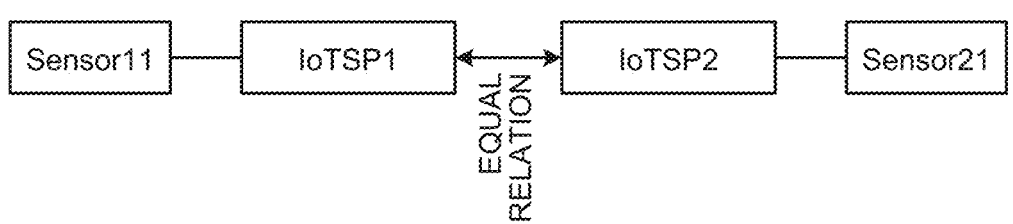
FIG. 77 is an explanatory diagram (part 4) of the modification.
Figure 78:
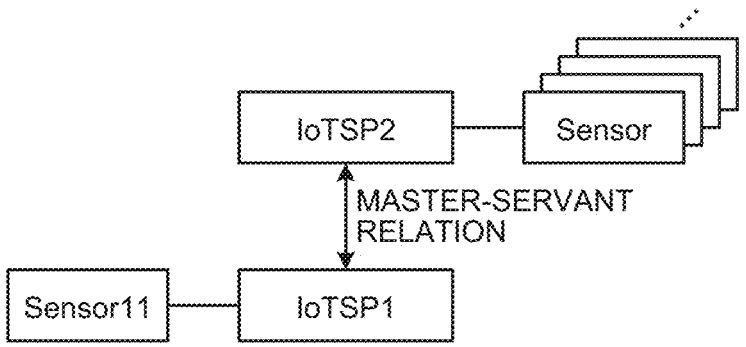
FIG. 78 is an explanatory diagram (part 5) of the modification.

Note that examples of the contract relation referred to herein include the examples illustrated in FIG. 77 and FIG. 78. As illustrated in FIG. 77, for example, when two IoTSPs include the same type of sensors and are in a so-called equal relation, a contract relation in which data is provided free of charge to each other can also be established in terms of business.

In contrast, as illustrated in FIG. 78, when a sensor group included in one (the IoTSP2) of the two IoTSPs is more substantial than the other (IoTSP1), the IoTSPs tend to have a master-servant relation in which the IoTSP2 is a master and the IoTSP1 is a servant. In such a case, in terms of business, a contract relation in which the IoTSP2 provides data to the IoTSP1 for a fee can also be established.

Therefore, for example, in a use case illustrated in FIG. 77, the IoTSP 1 may indirectly acquire necessary data with respect to other equal IoTSPs including the IoTSP 2. On the other hand, for example, in a use case illustrated in FIG. 78, the IoTSP 1 may always directly acquire necessary data from the IoTSP 5.

Note that the effects described in this specification are only illustrations and are not limited. Other effects may be present.

The present technology can also take the following configurations.

(1)

An information processing apparatus that operates as a first IoTSP (Internet of Things Service Provider) that provides a service for causing a user to acquire sensor data, the information processing apparatus comprising:

a communication unit that executes communication with a second IoTSP other than the first IoTSP; and a control unit that searches the sensor data corresponding to an acquisition request of the user via an application and responds to the user with the searched sensor data, wherein the control unit searches the sensor data from the second IoTSP via the communication unit based on an identifier of the second IoTSP included in the acquisition request and policy information indicating propriety of information sharing between the IoTSPs and uses a protocol interface including a same procedure as a procedure between the application and the first IoTSP when searching the sensor data.

(2)

The information processing apparatus according to (1), wherein the control unit indirectly acquires the sensor data from the second IoTSP via a third IoTSP other than the first IoTSP and the second IoTSP.

(3)

The information processing apparatus according to (2), wherein a singularity or more of the third IoTSPs are connected between the first IoTSP and the second IoTSP in a straight chain shape.

(4)

The information processing apparatus according to (3), wherein the control unit executes the same procedure using a query language.

(5)

The information processing apparatus according to (4), wherein each of the first IoTSP and the second IoTSP includes a first database that stores configuration information of the IoTSP and a second database that stores the sensor data of a sensor node managed by each of the first IoTSP and the second IoTSP, and the control unit acquires the sensor data by inquiring the first database and the second database using the query language.

(6)

The information processing apparatus according to (5), wherein the configuration information includes the policy information, the policy information of the first IoTSP is set by an administrator of the first IoTSP, and the control unit causes, based on the policy information, the second IoTSP and the third IoTSP enabled to perform the information sharing to share the configuration information.

(7)

The information processing apparatus according to (6), wherein, when the configuration information of the first IoTSP is changed, the control unit causes the second IoTSP and the third IoTSP enabled to perform the information sharing to share the configuration information of the first IoTSP according to a change registration request that is made using the query language for the first database of each of the second IoTSP and the third IoTSP.

(8)

The information processing apparatus according to (7), wherein the control unit encrypts content of the changed configuration information such that only the second IoTSP or the third IoTSP enabled to perform the information sharing can decrypt the content.

(9)

The information processing apparatus according to any one of (5) to (8), wherein the configuration information has data structure in which a relation between geographical information concerning an area managed by the first IoTSP and the sensor node managed in the area is represented by an ontology.

(10)

The information processing apparatus according to (9), wherein the configuration information has the data structure represented by the ontology in which each of the area, the sensor node, and a point installed in the area and terminating the sensor node is a class.

(11)

The information processing apparatus according to (10), wherein the control unit searches the sensor data corresponding to the point included in a search range designated by the user via the application.

(12)

The information processing apparatus according to (10) or (11), wherein the sensor node includes a mobile body temporarily connected to the point.

(13)

An information processing system comprising:

a first information processing apparatus that is the information processing apparatus according to any one of (1) to (12); and a second information processing apparatus that operates as the second IoTSP.

(14)

An information processing method using an information processing apparatus that operates as a first IoTSP (Internet of Things Service Provider) that provides a service for causing a user to acquire sensor data, the method comprising:

executing communication with a second IoTSP other than the first IoTSP; and searching the sensor data corresponding to an acquisition request of the user via an application and responding to the user with the searched sensor data, wherein the responding includes searching the sensor data from the second IoTSP via executing the communication based on an identifier of the second IoTSP included in the acquisition request and policy information indicating propriety of information sharing between the IoT-SPs and using a protocol interface including a same procedure as a procedure between the application and the first IoTSP when searching the sensor data.

(15)

An information processing program for causing a computer to function as a first IoTSP (Internet of Things Service Provider) that provides a service for causing a user to acquire sensor data, the information processing program causing the computer to execute:

executing communication with a second IoTSP other than the first IoTSP; and searching the sensor data corresponding to an acquisition request of the user via an application and responding to the user with the searched sensor data, wherein the responding includes searching the sensor data from the second IoTSP via executing the communication based on an identifier of the second IoTSP included in the acquisition request and policy information indicating propriety of information sharing between the IoT-SPs and using a protocol interface including a same procedure as a procedure between the application and the first IoTSP when searching the sensor data.

REFERENCE SIGNS LIST

100 INFORMATION PROCESSING APPARATUS
110 COMMUNICATION UNIT
120 STORAGE UNIT
130 CONTROL UNIT

The invention claimed is:

1. An information processing apparatus that operates as a first Internet of Things Service Provider (IoTSP) that provides a service for causing a user to acquire sensor data, the information processing apparatus comprising:

a memory; and a processor configured to search the sensor data corresponding to an acquisition request of the user via an application; and respond to the user with the searched sensor data, wherein the processor searches the sensor data from a second IoTSP other than the first IoTSP based on:

an identifier of the second IoTSP included in the acquisition request; and policy information indicating propriety of information sharing between the first IoTSP and the second IoTSP, when searching the sensor data, the processor uses a protocol interface including a same procedure as a procedure between the application and the first IoTSP, the processor executes the same procedure using a query language, each of the first IoTSP and the second IoTSP includes:

a first database that stores configuration information of the IoTSP; and a second database that stores the sensor data of a sensor node managed by each of the first IoTSP and the second IoTSP, and to acquire the sensor data, the processor:

inquires the first database and the second database using the query language, and acquires the sensor data from the second IoTSP via a third IoTSP other than the first IoTSP and the second IoTSP, the third IoTSP being connected between the first IoTSP and the second IoTSP.

2. The information processing apparatus according to claim 1, wherein the configuration information includes the policy information, the policy information of the first IoTSP is set by an administrator of the first IoTSP, and based on the policy information, the second IoTSP and the third IoTSP perform the information sharing to share the configuration information.

3. The information processing apparatus according to claim 2, wherein, when the configuration information of the first IoTSP is changed, the second IoTSP and the third IoTSP perform the information sharing to share the configuration information of the first IoTSP according to a change registration request made using the query language for the first database of each of the second IoTSP and the third IoTSP.

4. The information processing apparatus according to claim 3, wherein the processor encrypts content of the changed configuration information such that only the second IoTSP or the third IoTSP, which performs the information sharing, is authorized to decrypt the content.

5. The information processing apparatus according to claim 1, wherein the configuration information has data structure in which a relation between geographical information concerning an area managed by the first IoTSP and the sensor node managed in the area is represented by an ontology.

6. The information processing apparatus according to claim 5, wherein the configuration information has the data structure represented by the ontology in which each of the area, the sensor node, and a point installed in the area and terminating the sensor node is a class.

7. The information processing apparatus according to claim 6, wherein the processor searches the sensor data corresponding to the point included in a search range designated by the user via the application.

8. The information processing apparatus according to claim 6, wherein the sensor node includes a mobile body temporarily connected to the point.

9. An information processing system, comprising:

the information processing apparatus according to claim 1 that operates as the first IoTSP; and another information processing apparatus that operates as the second IoTSP.

10. An information processing method using an information processing apparatus that operates as a first Internet of Things Service Provider (IoTSP) that provides a service for causing a user to acquire sensor data, the information processing method comprising:

searching the sensor data corresponding to an acquisition request of the user via an application; and responding to the user with the searched sensor data, wherein the searching the sensor data from a second IoTSP other than the first IoTSP is based on;

an identifier of the second IoTSP included in the acquisition request; and policy information indicating propriety of information sharing between the first IoTSP and the second IoTSP, the searching the sensor data includes using a protocol interface including a same procedure as a procedure between the application and the first IoTSP, the procedure is executed using a query language, each of the first IoTSP and the second IoTSP includes:

a first database that stores configuration information of the IoTSP; and a second database that stores the sensor data of a sensor node managed by each of the first IoTSP and the second IoTSP, and to acquire the sensor data, the information processing method further includes:

inquiring the first database and the second database using the query language; and acquiring the sensor data from the second IoTSP via a third IoTSP other than the first IoTSP and the second IoTSP, the third IoTSP being connected between the first IoTSP and the second IoTSP.

11. A non-transitory computer readable medium storing computer executable instructions which, when executed by a computer functioning as a first Internet of Things Service Provider (IoTSP) that provides a service for causing a user to acquire sensor data, causes the computer to execute a process comprising:

searching the sensor data corresponding to an acquisition request of the user via an application; and responding to the user with the searched sensor data, wherein the searching the sensor data from a second IoTSP other than the first IoTSP is based on;

an identifier of the second IoTSP included in the acquisition request; and policy information indicating propriety of information sharing between the first IoTSP and the second IoTSP, the searching the sensor data includes using a protocol interface including a same procedure as a procedure between the application and the first IoTSP, the procedure is executed using a query language, each of the first IoTSP and the second IoTSP includes:

a first database that stores configuration information of the IoTSP; and a second database that stores the sensor data of a sensor node managed by each of the first IoTSP and the second IoTSP, and to acquire the sensor data, the information processing method further includes:

inquiring the first database and the second database using the query language; and acquiring the sensor data from the second IoTSP via a third IoTSP other than the first IoTSP and the second IoTSP, the third IoTSP being connected between the first IoTSP and the second IoTSP.

* * * * *